(12) United States Patent
Xu et al.

(10) Patent No.: US 11,379,422 B2
(45) Date of Patent: Jul. 5, 2022

(54) TEXT DEDUPLICATION METHOD AND APPARATUS, AND STORAGE MEDIUM

(71) Applicant: TENCENT TECHNOLOGY (SHENZHEN) COMPANY LIMITED, Shenzhen (CN)

(72) Inventors: Wei Xu, Shenzhen (CN); Li Zhong, Shenzhen (CN); Li Wang, Shenzhen (CN); Lichun Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 573 days.

(21) Appl. No.: 16/441,669

(22) Filed: Jun. 14, 2019

(65) Prior Publication Data
US 2019/0294588 A1    Sep. 26, 2019

Related U.S. Application Data

(63) Continuation of application No. PCT/CN2018/082107, filed on Apr. 8, 2018.

(30) Foreign Application Priority Data

Apr. 7, 2017 (CN) .......................... 201710225086.1

(51) Int. Cl.
*G06F 16/174* (2019.01)
*G06F 16/31* (2019.01)
(Continued)

(52) U.S. Cl.
CPC ........ *G06F 16/1748* (2019.01); *G06F 16/319* (2019.01); *G06F 40/211* (2020.01); *G06F 40/289* (2020.01); *G06F 40/30* (2020.01)

(58) Field of Classification Search
CPC .. G06F 16/1748; G06F 16/319; G06F 40/211; G06F 40/289; G06F 40/30
(Continued)

(56) References Cited

U.S. PATENT DOCUMENTS 6,615,209 B1 * 9/2003 Gomes .................... G06F 16/38
707/999.005
7,734,627 B1 * 6/2010 Tong ...................... G06F 16/319
707/737

(Continued)

FOREIGN PATENT DOCUMENTS

CN    101620616 A    1/2010
CN    102799647 A    11/2012
(Continued)

OTHER PUBLICATIONS

Pimentel et al., "Redblock: a tool for online deduplication on large datasets", 2017, Revista Brasileira de Computação Aplicada (Year: 2017).*
(Continued)

*Primary Examiner* — Mohammad S Rostami
*Assistant Examiner* — Robert F May
(74) *Attorney, Agent, or Firm* — Anova Law Group, PLLC

(57) ABSTRACT

A text deduplication method and apparatus, and a storage medium are provided. The method includes: obtaining a text set, the text set including a plurality of to-be-deduplicated texts; capturing, for each to-be-deduplicated text, a corresponding subtext string from the to-be-deduplicated text; and determining, in the text set, to-be-deduplicated texts having a same subtext string, to obtain text subsets. Each subtext string corresponds to a text subset, and each text subset includes one or more to-be-deduplicated texts that have the corresponding subtext string. The method also
(Continued)

includes performing text deduplication processing on the text subset corresponding to each subtext string, to obtain a deduplicated text set corresponding to each subtext string; and obtaining, according to the deduplicated text set corresponding to each subtext string, a result text set of the text set after the deduplication.

18 Claims, 6 Drawing Sheets

(51) Int. Cl.
*G06F 40/30* (2020.01)
*G06F 40/211* (2020.01)
*G06F 40/289* (2020.01)

(58) Field of Classification Search
USPC .......................................................... 707/758
See application file for complete search history.

(56) References Cited

U.S. PATENT DOCUMENTS

| | | | | |
|---|---|---|---|---|
| 2007/0005589 | A1* | 1/2007 | Gollapudi | G06F 16/313 |
| | | | | 707/E17.084 |
| 2013/0013597 | A1 | 1/2013 | He et al. | |
| 2014/0236907 | A1* | 8/2014 | Zinar | G06F 16/215 |
| | | | | 707/692 |
| 2014/0244300 | A1* | 8/2014 | Bess | G06F 16/22 |
| | | | | 705/3 |
| 2015/0142760 | A1 | 5/2015 | Jiang et al. | |

FOREIGN PATENT DOCUMENTS

| | | |
|---|---|---|
| CN | 102831127 A | 12/2012 |
| CN | 103970722 A | 8/2014 |
| CN | 104636319 A | 5/2015 |
| CN | 107025218 A | 8/2017 |
| WO | 2007086059 A2 | 8/2007 |
| WO | 2013108745 A1 | 7/2013 |

OTHER PUBLICATIONS

Uwamahoro et al., "Efficient Algorithm for Near Duplicate Documents Detection", Mar. 2013, International Journal of Computer Sciences Issues, vol. 10 Issue 2, No. 2 (Year: 2013).*

The World Intellectual Property Organization (WIPO) International Search Report for PCT/CN2018/082107 dated Jun. 26, 2018 6 Pages (including translation).

The State Intellectual Property Office of the People's Republic of China (SIPO) Office Action 1 for 201710225086.1 dated Oct. 19, 2020 7 Pages (including translation).

* cited by examiner

Corpus set t1

随着新手机发布热潮的到来，人们将目光重新聚焦到国产手机上……
(Along with new mobile phone launches booming, people refocus their attention on domestic mobile phones…)

t2

随着新手机发布热潮的到来，人们将目光重新聚集在国产手机上……
(Along with new mobile phone launches booming, people refocus their attention on domestic mobile phones…)
…

FIG. 1c

Corpus set t1

随着新手机发布热潮的到来，人们将目光重新聚焦到国产手机上……
(Along | with | new | mobile | phone | launches booming, people refocus their attention on domestic mobile phones…)

Sliding window t2

随着新手机发布热潮的到来，人们将目光重新聚集在国产手机上……
(Along | with | new | mobile | phone | launches booming, people refocus their attention on domestic mobile phones…)

Sliding window
…

FIG. 1d

TEXT DEDUPLICATION METHOD AND APPARATUS, AND STORAGE MEDIUM

CROSS-REFERENCES TO RELATED APPLICATIONS

This application is a continuation application of PCT Patent Application No. PCT/CN2018/082107, filed on Apr. 8, 2018, which claims priority to Chinese Patent Application No. 201710225086.1, entitled "TEXT DEDUPLICATION METHOD AND APPARATUS" filed with the China National Intellectual Property Administration on Apr. 7, 2017, the entire contents of both of which are incorporated herein by reference.

FIELD OF TECHNOLOGY

This application relates to the field of computer technologies, and specifically, to a text deduplication method and apparatus, and a storage medium.

BACKGROUND OF THE DISCLOSURE

Currently, there are massive text files in the Internet, and the text files include lots of repeated text content. If there are lots of repeated texts in the Internet, on one hand, overall text quality is reduced; on the other hand, many storage resources are wasted.

SUMMARY

Embodiments of this application provide a text deduplication method and apparatus, and a storage medium, to improve text deduplication efficiency.

An embodiment of this application provides a text deduplication method, applied to a computing device. The method includes: obtaining, by the computing device, a text set, the text set including a plurality of to-be-deduplicated texts; capturing, by the computing device for each to-be-deduplicated text, a corresponding subtext string from the to-be-deduplicated text; and determining, by the computing device in the text set, to-be-deduplicated texts having a same subtext string, to obtain text subsets. Each subtext string corresponds to a text subset, and each text subset includes one or more to-be-deduplicated texts that have the corresponding subtext string. The method also includes performing text deduplication processing on the text subset corresponding to each subtext string, to obtain a deduplicated text set corresponding to each subtext string; and obtaining, by the computing device according to the deduplicated text set corresponding to each subtext string, a result text set of the text set after the deduplication.

An embodiment of this application further provides a text deduplication apparatus, including: a processor and a memory connected to the processor, the memory storing a machine readable instruction executable to the processor. The processor is configured to execute the machine readable instruction to perform: obtaining a text set, the text set including a plurality of to-be-deduplicated texts; capturing, for each to-be-deduplicated text, a corresponding subtext string from the to-be-deduplicated text; and determining, in the text set, to-be-deduplicated texts having a same subtext string, to obtain text subsets. Each subtext string corresponds to a text subset, and each text subset includes one or more to-be-deduplicated texts that have the corresponding subtext string. The processor is also configured to perform: performing text deduplication processing on the text subset corresponding to each subtext string, to obtain a deduplicated text set corresponding to each subtext string; and obtaining, according to the deduplicated text set corresponding to each subtext string, a result text set of the text set after the deduplication.

An embodiment of this application further provides a non-transitory computer readable storage medium, the storage medium storing a machine readable instruction. The machine readable instruction are executable to a processor to perform: obtaining a text set, the text set including a plurality of to-be-deduplicated texts; capturing, for each to-be-deduplicated text, a corresponding subtext string from the to-be-deduplicated text; and determining, in the text set, to-be-deduplicated texts having a same subtext string, to obtain text subsets. Each subtext string corresponds to a text subset, and each text subset includes one or more to-be-deduplicated texts that have the corresponding subtext string. The machine readable instruction also cause the processor to perform: performing text deduplication processing on the text subset corresponding to each subtext string, to obtain a deduplicated text set corresponding to each subtext string; and obtaining, according to the deduplicated text set corresponding to each subtext string, a result text set of the text set after the deduplication.

BRIEF DESCRIPTION OF THE DRAWINGS

To describe technical solutions in the embodiments of this application more clearly, the following briefly describes the accompanying drawings required for describing the embodiments. Apparently, the accompanying drawings in the following descriptions show only some embodiments of this application, and a person of ordinary skill in the art may still derive other drawings from these accompanying drawings without creative efforts.

FIG. 1c is a schematic diagram of a to-be-deduplicated text according to an embodiment of this application.

FIG. 1d is a schematic diagram of capture of a subtext string according to an embodiment of this application.

DESCRIPTION OF EMBODIMENTS

The following clearly and completely describes the technical solutions in the embodiments of this application with reference to the accompanying drawings in the embodiments of this application. Apparently, the described embodiments are merely some embodiments rather than all embodiments of this application. All other embodiments obtained by a person skilled in the art based on the embodiments of this application without creative efforts shall fall within the protection scope of this application.

When there are massive repeated texts in the Internet, to save storage resources, repeated text content needs to be removed. A traditional text deduplication manner is: comparing a plurality of to-be-deduplicated texts in pairs, and removing a repeated text based on a comparison result. However, in this text deduplication manner, the to-be-deduplicated texts need to be compared in pairs, wasting lots of time when there are massive to-be-deduplicated texts. Therefore, time complexity is relatively high in this text deduplication manner, causing relatively low text deduplication efficiency. A text, as used herein, may also be considered as a text file. The text deduplication process may also be considered as removing duplicated file(s) containing same/similar text contents.

In view of this, the embodiments of this application provide a text deduplication method and apparatus, and a storage medium, to improve text deduplication efficiency. Detailed descriptions are provided below separately.

Figure 1A:
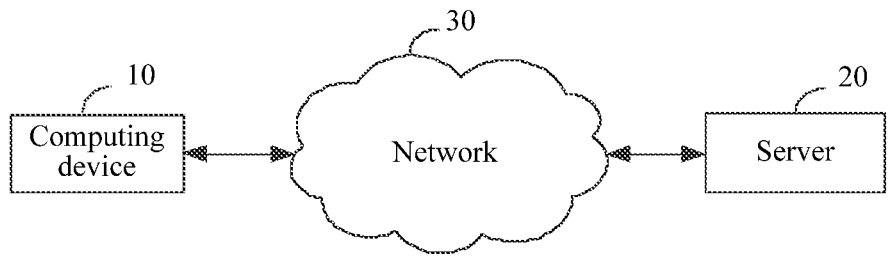
FIG. 1a is a schematic diagram of an implementation environment of a text deduplication method according to an embodiment of this application.

FIG. 1a is a schematic diagram of an implementation environment of a text deduplication method according to an embodiment of this application. A text deduplication apparatus provided in any embodiment of this application is integrated into a computing device 10, to implement a text deduplication method provided in any embodiment of this application. The computing device 10 is connected to a server 20 through a network 30. The network 30 may be a wired network, or may be a wireless network.

The embodiments of this application are described from the perspective of a text deduplication apparatus. The text deduplication apparatus may be specifically integrated into the computing device. The computing device may be a terminal or a server, for example, a text deduplication server.

A text deduplication method is provided. The method is applied to a computing device, and includes: obtaining a text set, the text set including a plurality of to-be-deduplicated texts; then, capturing, for each to-be-deduplicated text, a corresponding subtext string from the to-be-deduplicated text; determining to-be-deduplicated texts having the same subtext strings in the text set, to obtain a text subset corresponding to each subtext string; performing text deduplication processing on the text subset corresponding to each subtext string, to obtain a deduplicated text set corresponding to each subtext string; and obtaining, according to the deduplicated text set corresponding to each subtext string, a result text set of the text set after the deduplication.

Figure 1B:
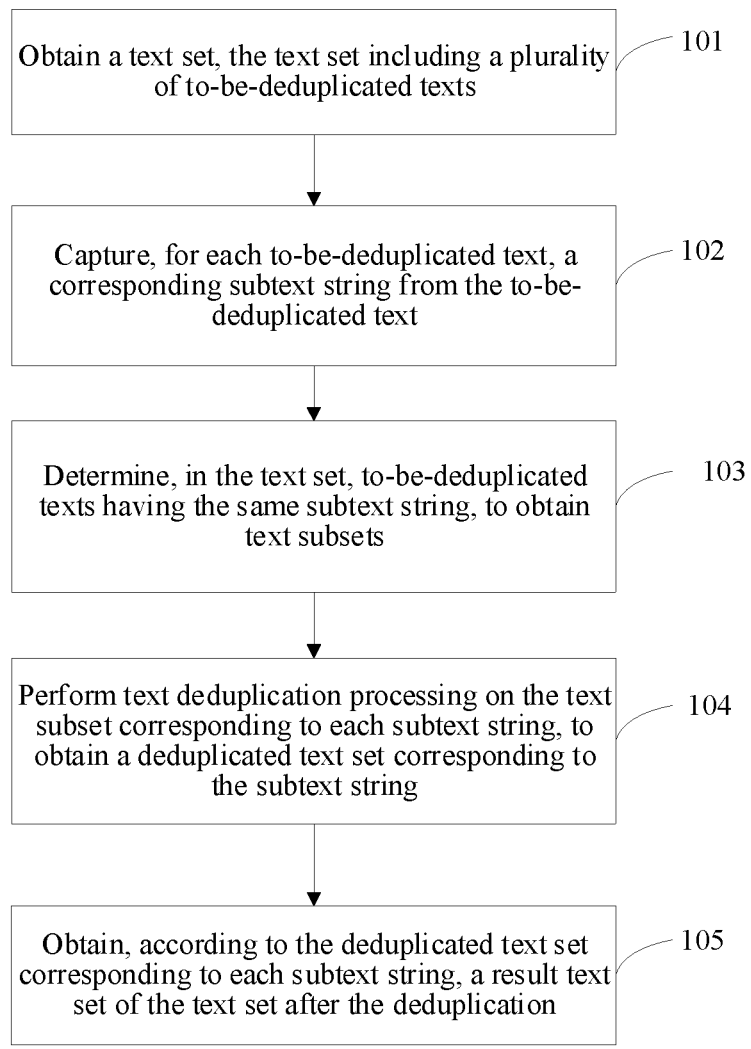
FIG. 1b is a schematic flowchart of a text deduplication method according to an embodiment of this application.

As shown in FIG. 1b, a specific procedure of the text deduplication method may be as follows:

Step 101. Obtain a text set, the text set including a plurality of to-be-deduplicated texts.

The text set may include at least two to-be-deduplicated texts, for example, including a to-be-deduplicated text t1, a to-be-deduplicated text t2, . . . , and a to-be-deduplicated text tn, where n is greater than or equal to 2 and is a positive integer. The to-be-deduplicated text is a text on which text deduplication needs to be performed. The text may include content such as a word. In addition, the text may further include a picture or the like.

The text deduplication in some embodiments means removing a similar or same text from the text set. The deduplication method in some embodiments is based on such a fact: Any two similar texts that can be determined are inevitably completely the same in terms of one or more subtext strings.

Step 102. Capture, for each to-be-deduplicated text, a corresponding subtext string from the to-be-deduplicated text.

Specifically, for each to-be-deduplicated text, the corresponding subtext string may be captured from the to-be-deduplicated text, to obtain a text string set corresponding to the to-be-deduplicated text. The text string set corresponding to a to-be-deduplicated text may include one or more subtext string, each subtext string being a portion of or all of the to-be-deduplicated text.

For example, for the to-be-deduplicated text t1, the to-be-deduplicated text t2, . . . , and the to-be-deduplicated text tn, a corresponding subtext string may be captured from the to-be-deduplicated text t1, to obtain a text string set W1 corresponding to t1; a corresponding subtext string may be captured from the to-be-deduplicated text t2, to obtain a text string set W2 corresponding to t2; . . . ; and a corresponding subtext string may be captured from the to-be-deduplicated text tn, to obtain a text string set Wn corresponding to tn.

The subtext string may be a character string, and the character string may include several character units. The character unit may be a single character, for example, a word, an alphabet, or a symbol. In this case, the subtext string is a character string including several characters. For example, referring to FIG. 1c, the to-be-deduplicated text t1 may be "随着新手机发布热潮的到来，人们将目光重新聚焦到国产手机上" (meaning: Along with new mobile phone launches booming, people refocus their attention on domestic mobile phones). The text string set W1 corresponding to t1 may include a single-character subtext string such as the first character of t1, i.e., "随" (meaning: along), and/or may include a multi-character subtext string such as the first three characters of t1, i.e., "随着新" (meaning: along with new).

The character unit may alternatively include a plurality of characters. For example, the character unit may be a word group. In some embodiments, a word group may refer to a group of consecutive character(s) or a phrase in a text that has certain semantic meaning. In an actual application, the character unit may be a word group obtained by performing word/phrase segmentation (also referred as word-group segmentation/division) processing on the to-be-deduplicated text. For example, referring to FIG. 1c, the text string set W1 may include subtext strings such as "随着" (along with), "新手机" (new mobile phone), "发布" (launch), and "热潮" (booming). In this case, the step of "capturing, for each to-be-deduplicated text, a corresponding subtext string from the to-be-deduplicated text" may include:

performing, for each to-be-deduplicated text, word segmentation processing on the to-be-deduplicated text, to obtain a corresponding word group set; and capturing the subtext string(s) corresponding to the to-be-deduplicated text from the word group set.

For example, word segmentation processing is performed on the to-be-deduplicated text t1, to obtain a word group set C1 corresponding to t1, and the corresponding subtext string is captured from the word group set C1, to obtain the text string set W1 corresponding to t1; word segmentation processing is performed on the to-be-deduplicated text t2, to obtain a word group set C2 corresponding to t2, and the corresponding subtext string is captured from the word group set C2, to obtain the text string set W2 corresponding to t2; . . . ; and word segmentation processing is performed on the to-be-deduplicated text tn, to obtain a word group set Cn corresponding to tn, and the corresponding subtext string is captured from the word group set Cn, to obtain the text string set Wn corresponding to tn. In some embodiments, Wn may include all word groups from the word group set Cn as its subtext strings. In some other embodiments, Wn may exclude certain word group(s) Cn and only include part of the word groups from the word group set Cn as its subtext strings.

In some embodiments of this application, to reduce a quantity of captured subtext strings, reduce time complexity of text deduplication, and improve text deduplication efficiency, in some embodiments, some word groups may be removed, and then the corresponding subtext string is captured from remaining word groups. That is, the step of "capturing the corresponding subtext string from the word group set" may include:

deleting a corresponding word group from the word group set according to a preset word deletion rule, to obtain a word group set after the deletion; and capturing the corresponding subtext string from the word group set obtained through deletion.

The preset word deletion rule may be set according to an actual requirement. For example, some auxiliary/filler words (for example, "of") may be deleted.

In addition, in some embodiments of this application, the character unit may alternatively be a statement (such as a clause, a phrase, etc.). For example, the character unit may be a statement obtained by performing statement segmentation on the to-be-deduplicated text. For example, referring to FIG. 1c, one subtext string of the text string set may be "随着新手机发布热潮的到来" (meaning: along with new mobile phone launches booming).

In some embodiments of this application, the subtext string may be captured through sliding capture. Specifically, the step of "capturing, for each to-be-deduplicated text, a corresponding subtext string from the to-be-deduplicated text" may include:

obtaining a capture length of the subtext string; and capturing, for each to-be-deduplicated text, one or more subtext strings from the to-be-deduplicated text through sliding according to the capture length (i.e., using a sliding window having the capture length).

The capture length of the subtext string is a length for which the subtext string needs to be captured. In some embodiments, the length of the subtext string refers to a quantity of character units included in the subtext string.

Specifically, when the character unit is single character, the length of the subtext string is a quantity of characters included in the subtext string. For example, when the subtext string is "随着新" (meaning: along with new), because the subtext string includes three characters, the length of the subtext string is 3, in other words, the capture length is 3.

When the character unit is word group, the length of the subtext string is a quantity of word groups included in the subtext string. For example, when the subtext string is "随着新手机" (meaning: along with new mobile phone), because the subtext string includes two word groups, namely, "随着" (along with) and "新手机" (new mobile phone), the length of the subtext string is 2, in other words, the capture length is 2.

In some embodiments, the capture length cannot exceed a preset threshold. If the capture length exceeds the threshold, there is no same subtext string between texts. Therefore, the two texts are never compared by using an algorithm, and deduplication cannot be implemented. The threshold is defined as the maximum de-duplicatable length between the texts.

Using two similar texts, namely, t1 and t2, as an example, after deduplication, one of the two texts is removed, and maximum consecutive subtext strings that are completely the same between the two texts are obtained. Assuming that there are k maximum consecutive subtext strings, the k maximum consecutive subtext strings form a set defined as A={a1, a2, . . . , ak}, and lengths of these subtext strings also correspond to a set L={$l_1$, $l_2$, . . . , $l_k$}, in this case, the maximum de-duplicatable length between the two texts is:

$$m^* = \max_{0 \leq i \leq k} \{l_i\}$$

If all global texts are deduplicated, correspondingly, there is a global deduplication length m (that is, the capture length of the subtext string). The global deduplication length m indicates that if similar texts in these global texts need to be deduplicated, an appropriate capture length needs to be selected for each text. Generally, selection of the global deduplication length is related to a deduplication rate and time complexity of the algorithm. During actual selection, both the deduplication rate and the time complexity need to be considered.

In some embodiments, a smaller selected global deduplication length indicates a better text deduplication effect (a larger deduplication rate) and higher corresponding time complexity. A larger selected global deduplication length indicates a worse similar-text deduplication effect (where some similar texts are not compared) and lower time complexity. A reason herein is: If a relatively large global deduplication length is selected, the global deduplication length may be greater than maximum de-duplicatable lengths of many similar texts. Therefore, these similar texts are no longer determined as similar texts, and the deduplication rate decreases. However, as a quantity of comparison times decreases, the time complexity decreases. Oppositely, as the global deduplication length decreases, more similar texts are classified into the same subtext string. After similarity calculation, the corresponding similar texts are removed, and therefore the global deduplication rate increases. As a quantity of comparison times increases, the time complexity increases. Therefore, in an actual application, the deduplication rate and the time complexity may be comprehensively considered to determine the capture length of the subtext string.

In some embodiments, the global deduplication length m may be determined by using a sample text set. In this case, the global deduplication length is a theoretical global deduplication length. For example, similar texts may be sampled from real texts to obtain a similar-text set C. Then, the global deduplication length m is determined according to the similar text set C. It indicates through a plurality of experiments that, usually, when m≥4 (which usually corresponds to two Chinese words or four words), the time complexity has decreased to an acceptable range during text deduplication.

In an actual application, the capture length of the text string may be determined based on the theoretical global deduplication length calculated through sampling and the maximum de-duplicatable length between texts. For example, when the theoretical global deduplication length calculated through sampling is 4, an actual global deduplication length m may be calculated by using the following formula:

$$m = \max\left(4, \min_{i \in C}(m_i^*)\right)$$

In some embodiments, after the capture length is obtained, the capture length may be compared with a length of the to-be-deduplicated text, and the subtext string may be captured in different manners based on a value relationship between the capture length and the length of the to-be-deduplicated text. Specifically, the step of "capturing one or more subtext strings from the to-be-deduplicated text through sliding according to the capture length" may include:

capturing the one or more subtext strings from the to-be-deduplicated text through sliding according to the capture length when a length of the to-be-deduplicated text is greater than or equal to the capture length, where lengths of the subtext strings are equal to the capture length; or using the to-be-deduplicated text as the subtext string when a length of the to-be-deduplicated text is less than the capture length, where it indicates that the entire to-be-deduplicated text is captured as the subtext string.

The length of the to-be-deduplicated text is a quantity of character units included in the to-be-deduplicated text, for example, a quantity of characters or word groups included in the to-be-deduplicated text. For example, when the to-be-deduplicated text includes 80 words, the length of the to-be-deduplicated text is 80.

When the length of the to-be-deduplicated text is greater than or equal to the capture length, a quantity of captured subtext strings may be a value obtained by adding 1 to a difference between the length of the to-be-deduplicated text and the capture length.

For example, it is assumed that a to-be-deduplicated text is t, and a length thereof is n. S is defined as a set of captured subtext strings, namely, a text string set. There are the following two cases according to a value relationship between m and n:

(1) When n≥m, a set of subtext strings may be captured according to a value of m. A value of the set is n−m+1, and S is indicated as S={s1, s2, . . . , s(n−m+1)} by using symbols.

(2) When n<m, a substring having a length of m cannot be captured. Therefore, the entire text is added to a substring set as a whole, and S={t}.

In some embodiments, an implementation of the capturing the subtext strings through sliding is: constructing a sliding window of the capture length, and then sliding the sliding window in the to-be-deduplicated text according to a preset sliding direction and a preset sliding length to capture the one or more (several) subtext strings. That is, the step of "capturing several subtext strings from the to-be-deduplicated text through sliding according to the capture length" may include:

constructing a sliding window according to the capture length, where a length of the sliding window is equal to the capture length; and sliding the sliding window in the to-be-deduplicated text according to a preset sliding window and a preset sliding length to capture the several subtext strings.

In some embodiments, the preset sliding direction is a sliding direction of the sliding window in the text and is set according to an actual requirement, and for example, may be a direction from the first character unit in the text to the last character unit in the text. The preset sliding length is a length or a step for which the sliding window slides each time. The length is a quantity of character units for which the sliding window needs to slide each time. For example, when the sliding window needs to slide for one character unit each time, the sliding length is 1.

Referring to FIG. 1d, it is assumed that when the character unit is a single character and the capture length is 4, the length of the text t is 32 that is greater than 4. Therefore, the subtext strings may be captured by using 1 as the sliding length (interval) in a direction from the beginning to the end of the text, and are respectively "随着新手" (along with new mobile), "着新手机" (with new mobile phone), "新手机发" (new mobile phone launch), and the like.

Step 103. Determine to-be-deduplicated texts having a same subtext strings in the text set, to obtain a text subset corresponding to each subtext string. In other words, in the text set, to-be-deduplicated texts having a same subtext string are determined to obtain text subsets. Each subtext string corresponds to a text subset, and each text subset includes one or more to-be-deduplicated texts that have the corresponding subtext string. In some embodiments, a text subset corresponding to a subtext string S1 may include all to-be-deduplicated texts within the text set that have the subtext string S1.

The text subset corresponding to the subtext string includes the to-be-deduplicated texts having the subtext string. For example, a text subset corresponding to a subtext string s1 includes all to-be-deduplicated texts having the subtext string s1. For example, s1 is included in t1, and when the to-be-deduplicated text t2, the to-be-deduplicated text t3, and the to-be-deduplicated text t4 all have the subtext string s1, the text subset corresponding to s1 includes t1, t2, t3, and t4.

For example, assuming that lengths of the to-be-deduplicated text t1, the to-be-deduplicated text t2, and the to-be-deduplicated text t3 are all n, and the capture length is m, in this case, after the subtext string is captured from each of the to-be-deduplicated text t1, the to-be-deduplicated text t2, and the to-be-deduplicated text t3, the text string set W1 {w11, w12, w13, . . . , w1(n−m+1)} corresponding to t1, the text string set W2 {w21, w22, w23, . . . , w2(n−m+1)} corresponding to t2, and the text string set W3 {w31, w32, w33, . . . , w3(n−m+1)} corresponding to t3 may be obtained. Each subtext string in the text string set includes several character units, and may have a length the same as the capture length.

In some embodiments, all to-be-deduplicated texts having w11 may be determined. For example, when w11, w21, and w31 are the same, in this case, it may be determined that the to-be-deduplicated texts having w11 are t1, t2, and t3. All to-be-deduplicated texts having w12 may be determined. For example, when w12, w22, and w32 are the same, it may be determined that the to-be-deduplicated texts having w12 are t1, t2, and t3. All to-be-deduplicated texts having w13, . . . , all to-be-deduplicated texts having w1(n−m+1), all to-be-deduplicated texts having w22, . . . , and all to-be-deduplicated texts having w32 may be determined. At last, text subsets corresponding to various different subtext strings may be obtained.

In some embodiments, there may be a plurality of manners of determining the to-be-deduplicated texts having the same subtext strings. For example, to improve a speed of determining the to-be-deduplicated texts having the same subtext strings to improve the text deduplication efficiency, in some embodiments, the to-be-deduplicated texts having the same subtext strings may be determined by using an inverted index. In some embodiments, an inverted index, as used herein, may refer to a database index storing a mapping from content (such as a subtext string or an index keyword) to its locations in a document or a set of documents (such as the corresponding to-be-deduplicated text or an index object). Specifically, the step of "determining, in the text set, to-be-deduplicated texts having a same subtext string, to obtain text subsets" may include:

establishing, for each to-be-deduplicated text, an inverted index between the to-be-deduplicated text and the subtext string (each of the one or more subtext string) in the text string set corresponding to the to-be-deduplicated text; and determining, based on the inverted index (e.g., indices established for some or all of the to-be-deduplicated texts and their subtext strings in their text string sets), the to-be-deduplicated texts having the same subtext string in the text set, to obtain the text subset corresponding to each subtext string.

The inverted index is derived from searching for a record according to an attribute value in an actual application. Each item in this index table includes an attribute value and an address of each record having the attribute value. This is referred to as the inverted index because the attribute value is not determined by using the record but a location of the record is determined by using the attribute value. A text or a file having an inverted index is referred to as an inverted index file, an inverted file for short.

In some embodiments, the inverted index between the to-be-deduplicated text and the subtext string in the text string set corresponding to the to-be-deduplicated text may be used to determine the to-be-deduplicated text by using the subtext string in the text set. The inverted index may include a plurality of index items or index pairs, and each index item or index pair includes an index keyword and an index entry corresponding to the index keyword. The index keyword may be the subtext string, and the index entry may be the to-be-deduplicated text corresponding to the subtext string. Therefore, in some embodiments, establishing the inverted index between the to-be-deduplicated text and the subtext string in the text string set corresponding to the to-be-deduplicated text is establishing an index pair or index item representing a correspondence between the subtext string and the to-be-deduplicated text. Specifically, the step of "establishing, for each to-be-deduplicated text, an inverted index between the to-be-deduplicated text and the subtext string in the text string set corresponding to the to-be-deduplicated text" may include:

using, for each to-be-deduplicated text, the one or more subtext strings in the text string set corresponding to the to-be-deduplicated text as one or more index keywords (e.g., each subtext string is an index keyword); and using the to-be-deduplicated text as an index object corresponding to the one or more index keywords; and combining the index keyword (e.g., each of the one or more index keywords) and the index object corresponding to the index keyword into a corresponding index pair (e.g., each pair includes one index keyword and one index object, and the number of index pairs obtained from one to-be-deduplicated text may equal the number of subtext strings of its corresponding text string set), to obtain the inverted index between the to-be-deduplicated text and the subtext string in the text string set corresponding to the to-be-deduplicated text.

In this case, the step of "determining, based on the inverted index, the to-be-deduplicated texts having the same subtext string in the text set, to obtain the text subset corresponding to each subtext string" may include:

determining index objects corresponding to the same index keyword in the index pair (based on index pairs obtained from the to-be-deduplicated texts), to obtain an object set corresponding to each index keyword as the text subset corresponding to each subtext string.

For example, after the text string set corresponding to each to-be-deduplicated text is obtained, for each text t, subtext strings in a text string set corresponding to the text t are traversed, and each subtext string in the set is used as a key (namely, the index keyword), the original text t corresponding to the key is used as a corresponding value (namely, the index object), and then a key-value pair (namely, the index pair) is obtained through combination. In this way, an inverted index between the text and the text string set can be obtained. After the text string sets of all the texts are traversed, the inverted index between each text and (for example, n−m+1) subtext strings corresponding to the text may be obtained.

For example, assuming that after the subtext string is captured from each of the to-be-deduplicated text t1, the to-be-deduplicated text t2, and the to-be-deduplicated text t3 that all have a length of n, the text string set W1 {w11, w12, w13, . . . , w1(n−m+1)} corresponding to t1, the text string set W2 {w21, w22, w23, . . . , w2(n−m+1)} corresponding to t2, and the text string set W3 {w31, w32, w33, . . . , w3(n−m+1)} corresponding to t3 may be obtained. Subsequently, an inverted index between t1 and the text string set W1 may be established. Specifically, the subtext strings in W1 are traversed, a currently traversed subtext string w1i is used as an index keyword key1i, and t1 is used as an index object value1. Then, an index pair (key1i, value1) is formed, where 1≤i≤n−m+1 and is a positive integer. In this way, index pairs (key11, value1), (key12, value1), . . . , (key1i, value1), . . . , and (key1[n−m+1], value1) can be obtained. Similarly, the subtext strings in W2 are traversed, a currently traversed subtext string w2i is used as an index keyword key2i, and t2 is used as an index object value2. Then, an index pair (key2i, value2) is formed. In this way, (key21, value2), (key22, value2), . . . , (key2i, value2), . . . , and (key2[n−m+1], value2) can be obtained. Similarly, the subtext strings in W3 may be further traversed, a currently traversed subtext string w3i is used as an index keyword key3i, and t3 is used as an index object value3. Then, an index pair (key3i, value3) is formed. In this way, (key31, value3), (key32, value3), . . . , (key3i, value3), . . . , and (key3[n−m+1], value3) can be obtained. At last, inverted indexes between t1 and the subtext strings in W1, inverted indexes between t2 and the subtext strings in W2, and the inverted indexes between t3 and the subtext strings in W3 can be obtained.

After the inverted index between each to-be-deduplicated text and the subtext string in the text string set corresponding to the to-be-deduplicated text is obtained, the index objects corresponding to the same index keyword may be determined in the index pairs, to obtain the object set corresponding to each index keyword. An object set corresponding to a specific index keyword includes index objects whose index keywords are all the index keyword. For example, a text subset corresponding to key11 includes a value whose key is key 1. The index keyword is the subtext string, and the index object is the to-be-deduplicated text. Therefore, the object set corresponding to each index keyword is the text subset corresponding to each subtext string. For example, after the key-value pair is obtained, all texts (in other words, index objects, namely, values) corresponding to the same index key value may be aggregated according to different index key values, to obtain a text subset corresponding to the index key value.

For example, after the inverted index between t1 and the subtext string in W1, the inverted index between t2 and the subtext string in W2, and the inverted index between t3 and the subtext string in W3 are obtained, indexes corresponding to different keys may be determined based on different keys, and then object sets corresponding to the different keys are obtained through aggregation. For example, when the text length is n=7 and the capture length m=4, if key11, key21, and key31 are the same, it may be determined that an object set corresponding to key11 is {t1, t2, t3}. If key12 is the same as key22 but is different from key32, it may be determined that an object set corresponding to key12 is {t1, t2}, and an object set corresponding to key32 is {t3}. If key13, key23, and key34 are the same, it may be determined that an object set corresponding to key13 is {t1, t2, t3}. If key14 is different from key24 and is the same as key34, it may be determined that an object set corresponding to key14 is {t1, t3}, and an object set corresponding to key24 is {t2}.

Step 104. Perform text deduplication processing on the text subset corresponding to each subtext string, to obtain a deduplicated text set corresponding to the subtext string.

After the text subset corresponding to each subtext string is obtained, the deduplication processing may be performed, for each subtext string, on the to-be-deduplicated texts in the text subset corresponding to the subtext string, to deduplicate the text set. For example, the to-be-deduplicated texts in the text subset corresponding to the subtext string may be combined in pairs for deduplication processing.

As described above, any two similar texts t1 and t2 that can be determined are inevitably completely the same in terms of one or more subtext strings. These maximum consecutive substrings that are completely the same form a set A={a1, a2, . . . , ak}. In a subtext string (for example, m-gram substring) segmentation process for t1 and t2, it is assumed that a text string set A1 and a text string set A2 may be respectively obtained. Assuming that there is a substring ai in A, and a length |ai| of the substring ai is greater than the global deduplication length m, the substring ai may be inevitably divided into |ai|−m+1 subtext strings (for example, m-gram substrings). In addition, these subtext strings inevitably exist in both A1 and A2. Further, both t1 and t2 exist in inverted indexes whose keys are the |ai|−m+1 m-gram substrings. Therefore, the texts having the same subtext string (or the same index keyword) are deduplicated, to globally deduplicate the texts.

During the deduplication, all the to-be-deduplicated texts corresponding to each subtext string may be compared in pairs for deduplication. In a specific implementation, a result set may be dynamically maintained to compare, in pairs, the texts corresponding to the same subtext string for deduplication. Specifically, the step of "performing text deduplication processing on the text subset corresponding to each subtext string, to obtain a deduplicated text set corresponding to each subtext string" may include:

selecting, for each subtext string, one to-be-deduplicated text as a seed text from the text subset corresponding to the subtext string, and adding the seed text to an empty deduplication result set;

traversing the to-be-deduplicated texts in the text subset, and determining whether a currently traversed to-be-deduplicated text and the text in the deduplication result set are similar texts;

adding the currently traversed to-be-deduplicated text to the deduplication result set if the currently traversed to-be-deduplicated text and the text in the deduplication result set are not similar texts, and traversing the next to-be-deduplicated text in the text subset; or traversing the next to-be-deduplicated text in the text subset if the currently traversed to-be-deduplicated text and the text in the deduplication result set are similar texts (e.g., a similarity degree between the two texts the satisfy certain condition); and using, when all the texts in the text subset are traversed, the deduplication result set as the deduplicated text set corresponding to the subtext string.

In some embodiments, a manner of comparing, in pairs, to-be-deduplicated texts corresponding to a specific subtext string (namely, a specific index keyword) for deduplication is: dynamically maintaining a result set, randomly selecting, as a seed text in an initial status, one text from the texts corresponding to the subtext string (namely, the index keyword), then traversing the to-be-deduplicated texts corresponding to the subtext string (namely, the index keyword), and attempting to add each traversed text to the result set. A specific text addition process is: determining whether the traversed text and each text in the result set are similar texts; and quitting traversal of the result set if the traversed text and a specific text in the result set are similar texts, and traversing the next to-be-deduplicated text; or adding the currently traversed text to the result set if no similar text of the traversed text is found after the result set is completely traversed, which indicates that there is no repetition between the to-be-deduplicated text and the texts in the known result set, and traversing the next to-be-deduplicated text.

For example, after an object set {t1, t2, t3, t4} corresponding to a specific key 1i is obtained, t3 may be randomly selected as a seed text and added to the empty deduplication result set. In this case, the deduplication result set is {t3}, and then the object set {t1, t2, t3, t4} corresponding to key1i is traversed. When t1 is traversed, it is determined whether t1 and t3 in the deduplication result set are similar texts. If t1 and t3 in the deduplication result set are not similar texts, t1 is added to the deduplication result set. In this case, the deduplication result set is {t1, t3}, and then t2 is traversed. If t1 and t3 in the deduplication result set are similar texts, t2 is traversed. Assuming that t1 and t3 are not similar texts, when t2 is traversed, it is determined whether t2 and both t1 and t3 in the deduplication result set are similar texts; and if t2 and any of t1 and t3 in the deduplication result set are similar texts, the next text t3 is traversed; or if neither t1 nor t3 in the deduplication result set is a similar text of t2, t2 is added to the deduplication result set. In this case, the deduplication result set is {t1, t2, t3}. When t3 is traversed, it is obvious that t3 and t3 in the deduplication result set are same texts. In this case, t4 is traversed. Assuming that neither t1 nor t3 in the deduplication result set is a similar text of t2, in this case, the deduplication result set is {t1, t2, t3}; and if t4 and any of t1, t2, and t3 in the deduplication result set are similar texts, the traversal ends; or if none of t1, t2, and t3 in the deduplication result set is a similar text of t4, t4 is added to the deduplication result set. In this case, the deduplication result set is {t1, t2, t3, t4}, and the traversal ends. At last, after the traversal ends, the deduplication result set may be used as the deduplicated text set corresponding to the subtext string. For example, the deduplication result set {t1, t2, t3, t4} is used as a deduplicated text set of key1i.

In some embodiments, there may be a plurality of manners of determining whether two texts are similar texts. For example, a similarity parameter between the two texts may be obtained, and it is determined, based on the similarity parameter, whether the two texts are similar texts. That is, the step of "determining whether a currently traversed to-be-deduplicated text and the text in the deduplication result set are similar texts" may include:

obtaining a similarity parameter between the currently traversed to-be-deduplicated text and the text in the deduplication result set; and determining, according to the similarity parameter, whether the currently traversed to-be-deduplicated text and the text in the deduplication result set are similar texts.

The similarity parameter may include: a Jaccard similarity, an editing distance, a Hamming distance, a semantic distance, and the like.

The editing distance is usually a Levenstein distance, and may be used for similarity measurement between two texts. A definition of the editing distance is: Two character strings are given, and an editing distance between the two character strings is the minimum quantity of operation times required for converting one character string into the other character string. The operation herein is limited to three types: insertion, deletion, and replacement for one character.

The semantic distance means that a similarity between two texts can also be measured from the semantic perspective. Methods such as a topic model and Word2Vec need to be used for calculating the semantic distance between the two texts. A basic method is: converting to-be-compared texts into a form of expression on the semantic level, and calculating a semantic distance between the two texts by using various distance representation methods.

The Hamming distance may be obtained based on a SimHash algorithm. SimHash is a locally sensitive hash algorithm, and the most important feature of SimHash is that, for similar texts, corresponding SimHash strings are also similar. That is, a similarity between SimHash signature values of two texts directly reflects a similarity between the original texts. This makes text deduplication possible. 01 strings are obtained after to-be-compared texts are mapped by using the SimHash algorithm. Obtained 01 strings of similar texts are different for 0 and 1 only at several locations and are completely the same at most locations. To indicate the similarity between the original texts, a quantity of locations at which 0 or 1 is different between the two 01 strings may be calculated, and an obtained value is the Hamming distance used for representing the similarity between the two texts that is obtained by using the SimHash algorithm. Usually, more similar texts indicate a smaller Hamming distance between corresponding SimHash fingerprints.

In an actual application, the similarity parameter may be a text similarity, for example, the Jaccard similarity. Specifically, word segmentation may be performed on to-be-compared texts to obtain two word group sets. Then, a text similarity is obtained based on the two word group sets. That is, the step of "obtaining a similarity parameter between the currently traversed to-be-deduplicated text and the text in the deduplication result set" may include:

respectively performing word-group segmentation processing on the currently traversed to-be-deduplicated text and the text in the deduplication result set, to obtain a first word group set corresponding to the currently traversed to-be-deduplicated text and a second word group set corresponding to the text in the deduplication result set; and obtaining a text similarity (e.g., the similarity parameter) between the currently traversed to-be-deduplicated text and the text in the deduplication result set according to the first word group set and the second word group set.

For example, a word group intersection set and a word group union set between the first word group set and the second word group set may be obtained, and then the text similarity is obtained based on the intersection set and the union set. Specifically, the text similarity is calculated based on a quantity of word groups in the intersection set and a quantity of word groups in the union set. For example, the word segmentation is performed on the to-be-compared texts. Assuming that sets, of the two to-be-compared texts, obtained through word segmentation are respectively A and B, a similarity between the two texts may be obtained according to the definition of the Jaccard similarity:

$$sim(A, B) = \frac{|A \cap B|}{|A \cup B|}$$

After the similarity parameter is obtained, it may be determined, according to a comparison result between a value of the similarity parameter and a preset threshold, whether the two compared texts are similar texts. For example, when the value of the similarity parameter is greater than the preset threshold, it is considered that the two compared texts are similar texts. Otherwise, when the value of the similarity parameter is not greater than the preset threshold, it is considered that the two compared texts are not similar texts.

For example, using an example in which the similarity parameter is the Jaccard similarity, a Jaccard similarity between two texts that are completely different is 0; oppositely, a Jaccard similarity between two texts that are completely the same is 1. Therefore, the Jaccard similarity is a number varying from 0 to 1. During the deduplication, an approximate threshold may be determined according to an actual requirement, and a text whose Jaccard similarity is greater than the threshold is determined as a similar text and is removed.

In some embodiments of this application, to alleviate deduplication computing load of a server and to improve a deduplication speed, in some embodiments, deduplication processing may be concurrently performed on text subsets of a plurality of subtext strings. For example, a plurality of different devices may be used to respectively perform deduplication processing on the text subsets of the corresponding subtext strings, and then deduplication results are obtained from the plurality of different devices, to obtain a result text set of the text set after the deduplication. That is, the step of "performing text deduplication processing on the text subset corresponding to each subtext string, to obtain a deduplicated text set corresponding to each subtext string" may include:

sending the text subset corresponding to each subtext string to a corresponding device, so that the device performs text deduplication processing on the text subset corresponding to the corresponding subtext string (e.g., respectively allocating the text subsets to a plurality of devices, so that each device receives different text subset(s) corresponding to different subtext string(s) and performs text deduplication processing on the received text subsets in parallel); and receiving the deduplicated text set that is of the corresponding subtext string and that is returned by the device, to obtain the deduplicated text set corresponding to each subtext string.

For example, after the texts are classified into corresponding index keywords, each index keyword (e.g., each subtext string) may be used as a key for hash, and all the to-be-deduplicated texts are allocated to corresponding machine nodes according to hash values. Each worker node in a distributed cluster only needs to be responsible for deduplication work of a local machine. In some embodiments, for example, all texts having the same subtext string S1 (i.e., text subset corresponding to S1) are sent to a same worker node WN1; all texts having the same subtext string S2 (i.e., text subset corresponding to S2) are sent to a same worker node WN2. Multiple worker nodes can perform deduplication in parallel. Then, a deduplication result returned by each machine node is received. After each worker node completes the deduplication work, only unrepeated texts are left for each index keyword. These texts are re-aggregated to form the result set after the deduplication.

Step 105. Obtain, according to the deduplicated text set corresponding to each subtext string, a result text set of the text set after the deduplication.

After the deduplicated text set corresponding to each subtext string is obtained, in other words, the deduplicated text set corresponding to each index keyword is obtained, same text deduplication processing may be performed on the deduplicated text set corresponding to each subtext string (where only one of a plurality of same texts is left), to obtain the result text set of the text set after the deduplication. For example, the deduplicated text set corresponding to each subtext string may be aggregated to obtain an initial result text set, and then same texts in the initial result text set are deduplicated.

For example, a deduplicated text set corresponding to key11 is {t1, t2}, and a deduplicated text set corresponding to key23 is {t1, t2, t3}. Because t1 and t2 exist in both the two sets, in this case, one t1 and one t2 may be removed, to finally obtain a result text set {t1, t3} (or {t2, t3}).

Figure 1E:
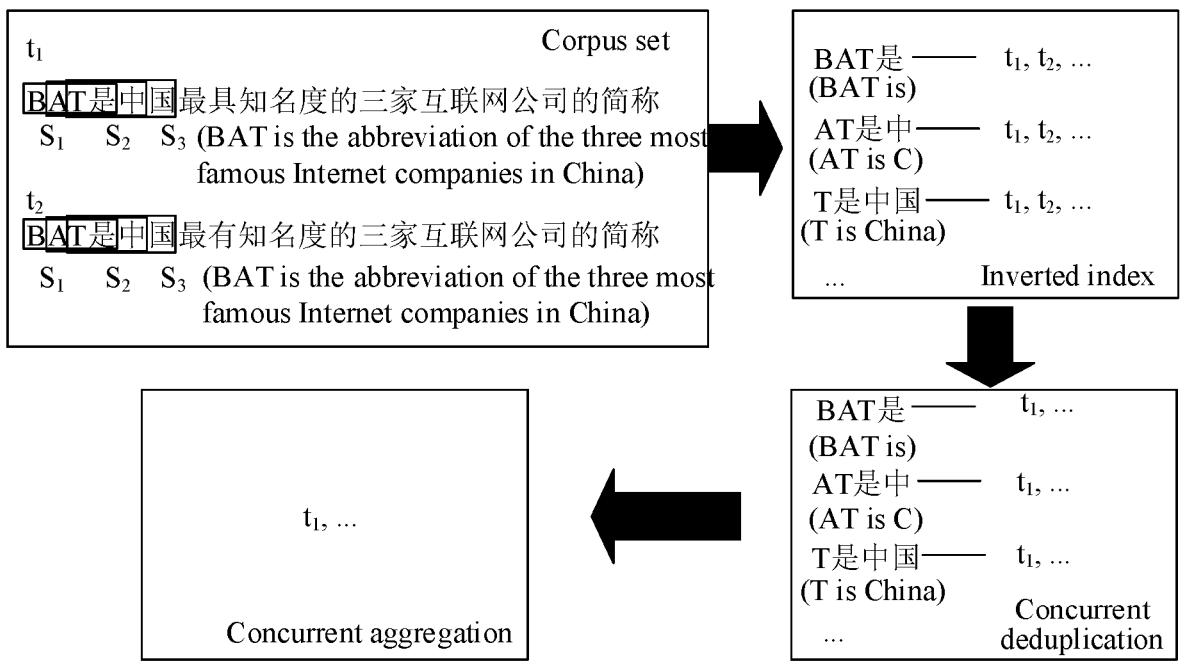
FIG. 1e is a schematic diagram of a text deduplication algorithm according to an embodiment of this application.

FIG. 1e is a schematic flowchart of deduplicating the to-be-deduplicated texts t1, t2, . . . , and tn by using the text deduplication method in some embodiments of this application. Both t1 and t2 are "BAT 是中国最具知名度的二家互联网公司 的简称" (meaning: BAT is the abbreviation of the three most famous Internet companies in China). Using an example in which the character unit is a single alphabetic character and the capture length m=4, first, for each to-be-deduplicated text, subtext strings are captured from the to-be-deduplicated text through sliding according to the capture length m. For example, subtext strings respectively captured from t1 and t2 are "BAT 是" (meaning: BAT is), "AT 是中" (meaning: AT is C), "T 是中国" (meaning: T is China), and the like. Then, to-be-deduplicated texts having the same subtext strings are determined to obtain a text subset corresponding to each subtext string. For example, a text subset corresponding to "BAT 是" is {t1, t2, . . . }, a text subset corresponding to "AT 是中" is {t1, t2, . . . }, a text subset corresponding to "T 是中国" is {t1, t2, . . . }, and the like. Next, text deduplication processing may be concurrently performed on the text subset corresponding to each subtext string, to obtain a deduplicated text set corresponding to each subtext string. For example, a deduplicated text set corresponding to "BAT 是" is {t1, . . . }, a deduplicated text set corresponding to "AT 是中" is {t1, . . . }, a deduplicated text set corresponding to "T 是中国" is {t1, . . . }, and the like. At last, the deduplicated text set corresponding to each subtext string is aggregated and similar texts are removed, to obtain a result text set, for example, {t1, . . . }, after the deduplication, thereby implementing text deduplication.

It can be learned from the foregoing that in some embodiments of this application, the text set is obtained, the text set including the plurality of to-be-deduplicated texts; then, for each to-be-deduplicated text, the corresponding subtext string is captured from the to-be-deduplicated texts; the to-be-deduplicated texts having the same subtext strings are determined in the text set, and the text subset corresponding to each subtext string is obtained; the text deduplication processing is performed on the text subset corresponding to each subtext string, to obtain the deduplicated text set corresponding to each subtext string; and the result text set of the text set is obtained after the deduplication according to the deduplicated text set corresponding to each subtext string. In this solution, the text deduplication processing may be performed on text subsets having the same subtext strings, to implement text deduplication processing on the entire text set. The texts in the entire text set do not need to be compared in pairs for deduplication, and global deduplication of the texts through comparison in pairs may be changed as deduplication of the texts corresponding to the same subtext string. Therefore, a quantity of texts needing to be compared in pairs in the deduplication process can be greatly reduced, thereby reducing the time complexity of the text deduplication and improving the text deduplication efficiency. In addition, because the quantity of texts needing to be compared in pairs in the deduplication process is decreased, storage space of a computing device performing the text deduplication method can be saved, a processing speed and processing efficiency of a processor of the computing device can be improved, and processing time can be reduced.

Detailed descriptions are further provided below by using an example according to the method described in the foregoing embodiment.

In an embodiment of this application, the text deduplication method provided in the embodiments of this application is described by using an example in which a text deduplication apparatus is integrated into a server.

Figure 2A:
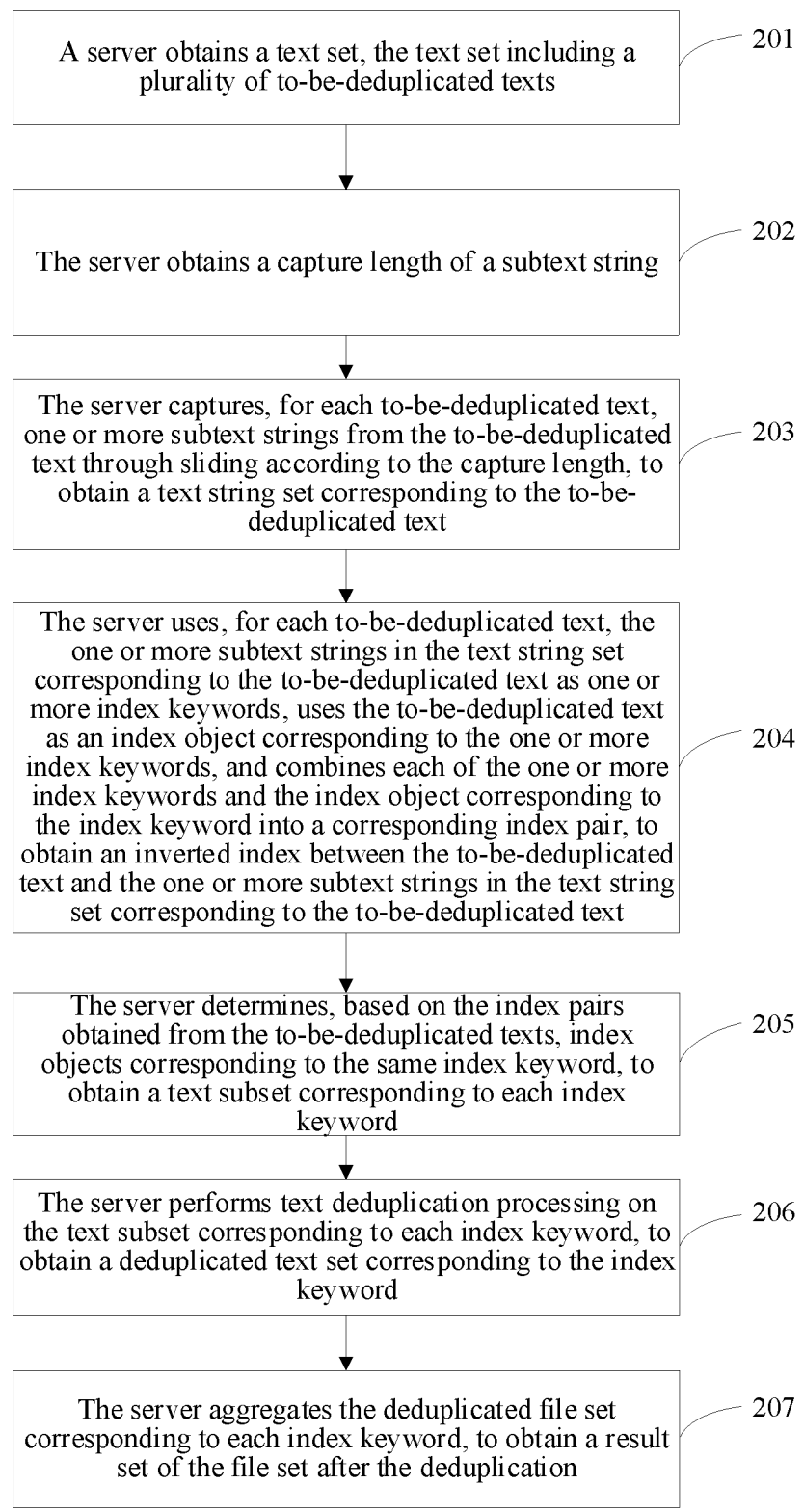
FIG. 2a is a schematic flowchart of a text deduplication method according to an embodiment of this application.

As shown in FIG. 2a, a text deduplication method is provided. A specific procedure may be as follows:

Step 201. A server obtains a text set, the text set including a plurality of to-be-deduplicated texts.

The text set may include at least two to-be-deduplicated texts, for example, including a to-be-deduplicated text t1, a to-be-deduplicated text t2, . . . , and a to-be-deduplicated text tn, where n is greater than or equal to 2 and is a positive integer. The to-be-deduplicated text is a text on which text deduplication needs to be performed. The text may include content such as a word. In addition, the text may further include a picture or the like. For example, the to-be-deduplicated text may be a web page text.

Step 202. The server obtains a capture length of a subtext string.

The subtext string may be a character string, and the character string may include several character units. The character unit may be a single character, for example, a word, an alphabet, or a symbol. In this case, the subtext string is a character string including several characters.

The character unit may alternatively include a plurality of characters. For example, the character unit may be a word group. In an actual application, the character unit may be a word group obtained by performing word segmentation processing on the to-be-deduplicated text.

The capture length of the subtext string is a length for which the subtext string needs to be captured. In some embodiments, the length of the subtext string refers to a quantity of character units included in the subtext string.

Specifically, when the character unit is a single character, the length of the subtext string is a quantity of characters included in the subtext string. When the character unit is a word group, the length of the subtext string is a quantity of word groups included in the subtext string.

In some embodiments of this application, a deduplication rate and time complexity may be comprehensively considered to determine an appropriate capture length of the subtext string, to ensure both the deduplication rate and the time complexity. In an actual application, the capture length of the text string may be determined based on a theoretical global deduplication length calculated through sampling and the maximum de-duplicatable length between texts. For example, when the theoretical global deduplication length calculated through sampling is 4, an actual global deduplication length m may be calculated by using the following formula:

$$m = \max\left(4, \min_{i \in C}(m_i^*)\right)$$

$$m^* = \max_{0 \leq i \leq k} \{l_i\}$$

is the maximum de-duplicatable length between the two texts.

Step 203. The server captures, for each to-be-deduplicated text, a corresponding subtext string from the to-be-deduplicated text through sliding according to the capture length, to obtain a text string set corresponding to the to-be-deduplicated text.

For example, when a length of the to-be-deduplicated text is greater than or equal to the capture length, a sliding window of the capture length is constructed, and then the sliding window is slid in the to-be-deduplicated text according to a preset sliding direction and a preset sliding length to capture several subtext strings.

In some embodiments, the preset sliding direction is a sliding direction of the sliding window in the text and is set according to an actual requirement, and for example, may be a direction from the last character unit in the text to the first character unit in the text. The preset sliding length is a length or a step for which the sliding window slides each time. The length is a quantity of character units for which the sliding window needs to slide each time. For example, when the sliding window needs to slide for two character units each time, the sliding length is 2.

For example, it is assumed that a to-be-deduplicated text is t, a length thereof is n, and a capture length is m. S is defined as a set of captured subtext strings, namely, a text string set. There are the following two cases according to a value relationship between m and n:

(1) When n≥m, a set of subtext strings may be captured through sliding according to a value of m. A value of the set is n−m+1, and S is indicated as S={s1, s2, . . . , s(n−m+1)} by using symbols.

(2) When n<m, a substring having a length of m cannot be captured. Therefore, the entire text is added to a substring set as a whole, and S={t}.

For example, using an example in which the capture length is 4, assuming that lengths of the to-be-deduplicated text t1, the to-be-deduplicated text t2, and the to-be-deduplicated text t3 are respectively 6, 7, and 8, in this case, after subtext strings are captured from each of the to-be-deduplicated text t1, the to-be-deduplicated text t2, and the to-be-deduplicated text t3, a text string set S1 {s1, s2, s3, . . . } corresponding to t1, a text string set S2 {s1, s2, s3, s4, . . . } corresponding to t2, and a text string set S3 {s1, s2, s3, s4, s5, . . . } corresponding to t3 may be obtained. The element s in the text string set S is the subtext string, and includes several character units. For example, s may include a plurality of single characters or word groups, and a length of s is equal to the capture length.

Step 204. The server uses, as an index keyword for each to-be-deduplicated text, the subtext string in the text string set corresponding to the to-be-deduplicated text, uses the to-be-deduplicated text as an index object corresponding to the index keyword, and combines the index keyword and the index object corresponding to the index keyword into a corresponding index pair, to obtain an inverted index between the to-be-deduplicated text and the subtext string in the text string set corresponding to the to-be-deduplicated text.

In some embodiments, the inverted index between the to-be-deduplicated text and the subtext string in the text string set corresponding to the to-be-deduplicated text may be used to determine the to-be-deduplicated text by using the subtext string in the text set. The inverted index may include a plurality of index items or index pairs, and each index item or index pair includes an index keyword and an index entry corresponding to the index keyword. The index keyword may be the subtext string, and the index entry may be the to-be-deduplicated text corresponding to the subtext string. Therefore, in some embodiments, establishing the inverted index between the to-be-deduplicated text and the subtext string in the text string set corresponding to the to-be-deduplicated text is establishing an index pair or index item representing a correspondence between the subtext string and the to-be-deduplicated text.

For example, after the text string set corresponding to each to-be-deduplicated text is obtained, for each text t, subtext strings in a text string set corresponding to the text (that is, an original set) are traversed, and each subtext string in the set is used as a key (namely, the index keyword), the original text t corresponding to the key is used as a corresponding value (namely, the index object), and then a key-value pair (namely, the index pair) is obtained through combination. In this way, an inverted index between the text and the text string set can be obtained. After the text string sets of all the texts are traversed, the inverted index between each text and (for example, n−m+1) subtext strings corresponding to the text may be obtained.

For example, after the text string set S1 {s1, s2, s3, . . . } corresponding to t1, the text string set S2 {s1, s2, s3, s4, . . . } corresponding to t2, and the text string set S3 {s1, s2, s3, s4, s5, . . . } corresponding to t3 are obtained, each element in S1 may be used as the index keyword, namely, the key, t1 is used as the index object, namely, the value, and then index pairs (key1, value1), (key2, value1), (key3, value1), and the like are formed. Similarly, each element in S2 may be used as the index keyword, namely, the key, t2 is used as the index object, namely, the value, index pairs (key1, value2), (key2, value2), (key3, value2), (key4, value2), and the like are formed; each element in S3 may be used as the index keyword, namely, the key, t3 is used as the index object, namely, the value, index pairs (key1, value3), (key2, value3), (key3, value3), (key4, value3), (key5, value3), and the like are formed.

Step 205. The server determines, in the index pairs, index objects corresponding to the same index keyword, to obtain a text subset corresponding to each index keyword.

After the inverted index between each to-be-deduplicated text and the subtext string in the text string set corresponding to the to-be-deduplicated text is obtained, the index objects corresponding to the same index keyword may be determined in the index pairs, to obtain the text subset corresponding to each index keyword. A text subset corresponding to a specific index keyword includes index objects whose index keywords are all the index keyword. For example, a text subset corresponding to key1 includes a value whose key is key1. The index keyword is the subtext string, and the index object is the to-be-deduplicated text. Therefore, the object set corresponding to each index keyword is the text subset corresponding to each subtext string. For example, after the key-value pair is obtained, all texts (in other words, index objects, namely, values) corresponding to the same index key value may be aggregated according to different index key values, to obtain a text subset corresponding to the index key value.

For example, a text subset {t1, t2, t3, . . . } corresponding to key1, a text subset {t1, t2, t3, . . . } corresponding to key2, a text subset {t1, t2, t3, . . . } corresponding to key3, a text subset {t2, t3, . . . } corresponding to key4, and a text subset {t3, . . . } corresponding to key5 may be obtained.

Step 206. The server performs text deduplication processing on the text subset corresponding to each index keyword, to obtain a deduplicated text set corresponding to the index keyword.

In some embodiments, the text deduplication processing may be concurrently performed on the text subset corresponding to each index keyword. For example, the server may respectively perform text deduplication processing on the text subset {t1, t2, t3, . . . } corresponding to key1, the text subset {t1, t2, t3, . . . } corresponding to key2, the text subset {t1, t2, t3, . . . } corresponding to key3, the text subset {t2, t3, . . . } corresponding to key4, and the text subset {t3, . . . } corresponding to key5, to obtain a deduplicated text set {t1, t2, . . . } corresponding to key1, a deduplicated text set {t1, t2, . . . } corresponding to key2, a deduplicated text set {t1, t2, . . . } corresponding to key3, a deduplicated text set {t1, t2, . . . } corresponding to key4, a deduplicated text set {t3, . . . } corresponding to key5, and the like.

In this application, all the to-be-deduplicated texts corresponding to each index keyword may be compared in pairs for deduplication. In a specific implementation, a result set may be dynamically maintained to compare the texts corresponding to the same index keyword in pairs for deduplication. Specifically, the server selects, as a seed text for each index keyword, one to-be-depulicated text from the text subset corresponding to the index keyword; adds the seed text to an empty deduplication result set; traverses the to-be-deduplicated texts in the text subset; determines whether a currently traversed to-be-deduplicated text and the text in the deduplication result set are similar texts; adds the currently traversed to-be-deduplicated text to the deduplication result set if the currently traversed to-be-deduplicated text and the text in the deduplication result set are not similar texts, and traverses the next to-be-deduplicated text in the text subset; or traverses the next to-be-deduplicated text in the text subset if the currently traversed to-be-deduplicated text and the text in the deduplication result set are similar text; and uses, when all the texts in the text subset are traversed, the deduplication result set as the deduplicated text set corresponding to the index keyword.

For example, using an example in which text deduplication is performed on the deduplicated text set {t1, t2, t3, . . . } corresponding to key1, one text may be randomly selected as a seed text and added to the deduplication result set. For example, t1 is selected as the seed text, in this case, the deduplication result set is {t1}, and then the text subset corresponding to key1 is traversed. When t1 is traversed, it is determined whether t1 and t1 in the deduplication result set are similar texts, and if yes, the next text t2 is traversed. It is obvious herein that t1 and t1 in the deduplication result set are similar texts. When t2 is traversed, it is determined whether t2 and t1 in the deduplication result set are similar texts; and if yes, the next text t3 is traversed; or if not, t2 is added to the deduplication result set, and then the next text t3 is traversed. Using an example in which t1 and t2 are not similar, in this case, the deduplication result set is {t1, t2}. When t3 is traversed, if t3 and any one of t1 and t2 in the deduplication result set are similar texts, the next text is traversed; or if neither t1 nor t2 in the deduplication result set is a similar text of t3, t3 is added to the deduplication result set. Using an example in which t2 and t3 are similar texts, in this case, the deduplication result set {t1, t2} remains unchanged, and the next text is traversed. The rest can be deduced by analogy until all the texts corresponding to key1 are traversed. At last, the deduplication result set is used as the deduplicated text set {t1, t2, . . . } corresponding to the index keyword.

In some embodiments, there may be a plurality of manners of determining whether two texts are similar texts. For example, a similarity parameter between the two texts may be obtained, and it is determined, based on the similarity parameter, whether the two texts are similar texts. Using an example in which the similarity parameter is a Jaccard similarity, word segmentation may be performed on to-be-compared texts, to obtain two word group sets. A word group intersection set and a word group union set of the two word group sets are obtained, and then the Jaccard similarity is calculated based on a quantity of word groups in both the intersection set and the union set. For example, the word segmentation is performed on the to-be-compared texts. Assuming that sets, of the two to-be-compared texts, obtained through word segmentation are respectively A and B, a similarity between the two texts may be obtained according to the definition of the Jaccard similarity:

$$sim(A, B) = \frac{|A \cap B|}{|A \cup B|}$$

After the similarity parameter is obtained, it may be determined, according to a comparison result between a value of the similarity parameter and a preset threshold, whether the two compared texts are similar texts. For example, using the example in which the similarity parameter is the Jaccard similarity, a Jaccard similarity between two texts that are completely different is 0; oppositely, a Jaccard similarity between two texts that are completely the same is 1. Therefore, the Jaccard similarity is a number varying from 0 to 1. During the deduplication, an approximate threshold may be determined according to an actual requirement, and a text whose Jaccard similarity is greater than the threshold is determined as a similar text and is removed.

In some embodiments of this application, the server may perform the text deduplication processing on the text subset corresponding to each index keyword. Alternatively, text subsets corresponding to different index keywords may be sent to different devices for deduplication processing, and then deduplication results are obtained from the processing devices, to obtain a result set of the text set after the deduplication.

Figure 2B:
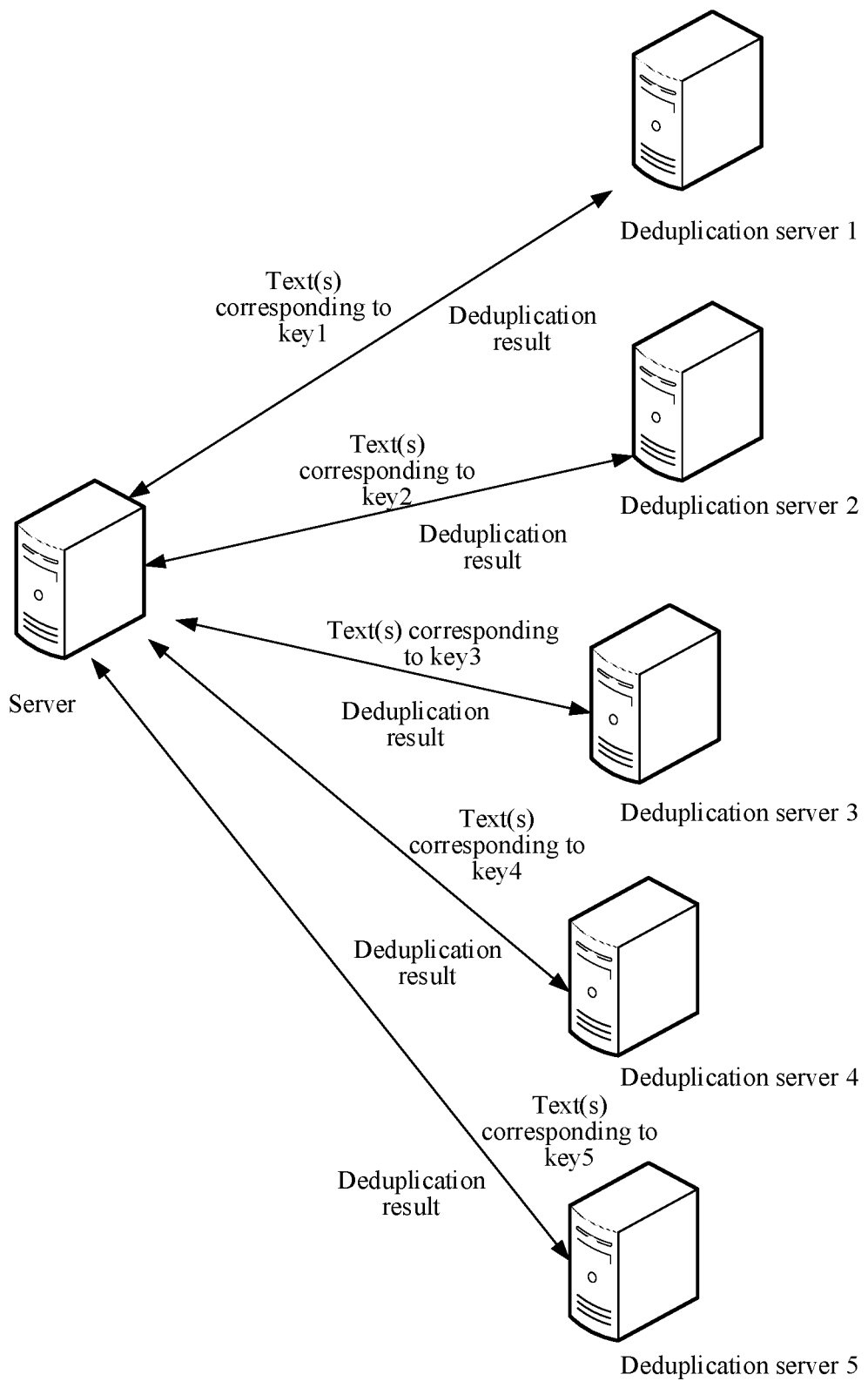
FIG. 2b is a schematic diagram of text deduplication using an index keyword according to an embodiment of this application.

For example, to alleviate deduplication computing load of the server and to improve a deduplication speed, the server may send, to a corresponding device according to different index keywords, the text subset corresponding to each index keyword, so that the device performs text deduplication processing on the text subset corresponding to the corresponding index keyword. The deduplicated text set that is of the corresponding index keyword and that is returned by the device is received, to obtain the deduplicated text set corresponding to each subtext string. Referring to FIG. 2b, the server may send the text subset {t1, t2, t3, ... } corresponding to key1 to a deduplication server 1 for text deduplication processing, send the text subset {t1, t2, t3, ... } corresponding to key2 to a deduplication server 2 for text deduplication processing, send the text subset {t1, t2, t3, ... } corresponding to key3 to a deduplication server 3 for text deduplication processing, send the text subset {t2, t3, ... } corresponding to key4 to a deduplication server 4 for text deduplication processing, and send the text subset {t3, ... } corresponding to key5 to a deduplication server 5 for text deduplication processing. After each deduplication server performs text deduplication on the text subset corresponding to each index keyword, the deduplication server may obtain the deduplicated text set corresponding to the index keyword, and send the deduplicated text set to the server.

Specifically, the server may hash the index keyword, namely, the key, to obtain a hash value, and then send the text subset corresponding to the index keyword to a machine node (for example, the deduplication server 1, the deduplication server 2, the deduplication server 3, the deduplication server 4, and the deduplication server 5 in FIG. 2b) according to the hash value, to perform the text deduplication processing.

Step 207. The server aggregates the deduplicated text set corresponding to each index keyword, to obtain a result set of the text set after the deduplication.

In some embodiments, the server may aggregate the deduplicated text set corresponding to each index keyword, to obtain an aggregated text set, and then remove a repeated text in the aggregated text set, to obtain the result set after the text deduplication.

For example, after the deduplicated text set {t1, t2, ... } corresponding to key1, the deduplicated text set {t1, t2, ... } corresponding to key2, the deduplicated text set {t1, t2, ... } corresponding to key3, the deduplicated text set {t1, t2, ... } corresponding to key4, and the deduplicated text set {t3, ... } corresponding to key5 are obtained, the deduplicated sets may be aggregated, and then the same and repeated text is removed, to obtain a result set {t1, t2, ... } after the text deduplication.

It can be learned from the foregoing that in some embodiments of this application, a method for substring segmentation such as m-gram substring segmentation and index establishment may be used, to respectively place all to-be-compared texts into "bucket" of a quantity of m-gram substrings. According to the idea of "segmentation into buckets", a quantity of texts needing to be compared in pairs is greatly decreased. Because a segment of subtext string is captured from an original text, it can be greatly ensured that different texts are allocated to different indexes, provided that the selected global deduplication length is appropriate. In an ideal case, if texts corresponding to a specific index are all similar texts, in this case, time complexity of deduplication corresponding to the index is O (n). Therefore, in some embodiments of this application, comparison between most dissimilar texts can be avoided. Only texts that may be similar are compared, to reduce time complexity of an algorithm. In addition, according to a characteristic that the algorithm is expansible in parallel, overall efficiency of the deduplication algorithm can be significantly improved.

Figure 3:
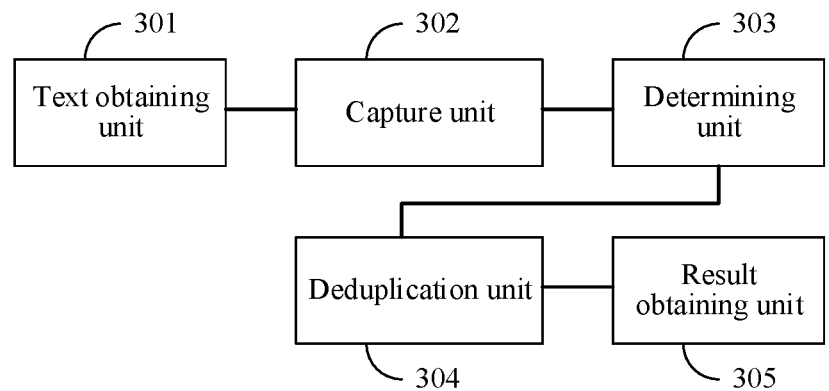
FIG. 3 is a schematic structural diagram of a text deduplication apparatus according to an embodiment of this application.

To better implement the foregoing methods, an embodiment of this application further provides a text deduplication apparatus. As shown in FIG. 3, the text deduplication apparatus includes: a text obtaining unit 301, a capture unit 302, a determining unit 303, a deduplication unit 304, and a result obtaining unit 305.

The text obtaining unit 301 is configured to obtain a text set, the text set including a plurality of to-be-deduplicated texts.

The text set may include at least two to-be-deduplicated texts, for example, including a to-be-deduplicated text t1, a to-be-deduplicated text t2, ..., and a to-be-deduplicated text tn, where n is greater than or equal to 2 and is a positive integer. The to-be-deduplicated text is a text on which text deduplication needs to be performed. The text may include content such as a word. In addition, the text may further include a picture or the like.

The text deduplication in some embodiments means removing a similar or same text from the text set. The deduplication method in some embodiments is based on such a fact: Any two similar texts that can be determined are inevitably completely the same in terms of one or more subtext strings.

The capture unit 302 is configured to capture, for each to-be-deduplicated text, a corresponding subtext string from the to-be-deduplicated text.

For example, the capture unit 302 may be configured to capture, for each to-be-deduplicated text, the corresponding subtext string from the to-be-deduplicated text, to obtain a text string set corresponding to the to-be-deduplicated text.

The capture unit 302 may include:

a length obtaining subunit, configured to obtain a capture length of the subtext string; and a text string capture subunit, configured to capture, for each to-be-deduplicated text, several subtext strings from the to-be-deduplicated text through sliding according to the capture length.

The subtext string may be a character string, and the character string may include several character units. The character unit may be a single character, for example, a word, an alphabet, or a symbol. In this case, the subtext string is a character string including several characters. The character unit may alternatively include a plurality of characters. For example, the character unit may be a word group.

For example, the text string capture subunit may be specifically configured to:

capture the several subtext strings through sliding from the to-be-deduplicated text through sliding according to the capture length when a length of the to-be-deduplicated text is greater than or equal to the capture length, where lengths of the subtext strings are equal to the capture length; or use the to-be-deduplicated text as the subtext string when a length of the to-be-deduplicated text is less than the capture length.

The determining unit 303 is configured to determine to-be-deduplicated texts having the same subtext strings in the text set, to obtain a text subset corresponding to each subtext string.

The text subset corresponding to the subtext string includes the to-be-deduplicated texts having the subtext string. For example, a text subset corresponding to a subtext string s1 in t1 includes all to-be-deduplicated texts having the subtext string s1. For example, when the to-be-deduplicated text t2, the to-be-deduplicated text t3, and the to-be-deduplicated text t4 all have the subtext string s1, the text subset corresponding to s1 includes t1, t2, t3, and t4.

In some embodiments, to improve a text deduplication speed, the to-be-deduplicated texts having the same subtext strings may be determined based on a manner of an inverted index. To be specific, the determining unit 303 may include:

an index establishment subunit, configured to establish, for each to-be-deduplicated text, an inverted index between the to-be-deduplicated text and the subtext string in the text string set corresponding to the to-be-deduplicated text; and a determining subunit, configured to determine, based on the inverted index, the to-be-deduplicated texts having the same subtext strings in the text set, to obtain the text subset corresponding to each subtext string.

In some embodiments, the inverted index between the to-be-deduplicated text and the subtext string in the text string set corresponding to the to-be-deduplicated text may be used to determine the to-be-deduplicated text by using the subtext string in the text set. The inverted index may include a plurality of index items or index pairs, and each index item or index pair includes an index keyword and an index entry corresponding to the index keyword. The index keyword may be the subtext string, and the index entry may be the to-be-deduplicated text corresponding to the subtext string. Therefore, in some embodiments, establishing the inverted index between the to-be-deduplicated text and the subtext string in the text string set corresponding to the to-be-deduplicated text is establishing an index pair or index item representing a correspondence between the subtext string and the to-be-deduplicated text.

Specifically, the index establishment subunit may be configured to:

use, as an index keyword for each to-be-deduplicated text, the subtext string in the text string set corresponding to the to-be-deduplicated text, and use the to-be-deduplicated text as an index object corresponding to the index keyword; and combine the index keyword and the index object corresponding to the index keyword into a corresponding index pair, to obtain the inverted index between the to-be-deduplicated text and the subtext string in the text string set corresponding to the to-be-deduplicated text.

In this case, the determining subunit may be configured to determine index objects corresponding to the same index keyword in the index pair, to obtain an object set corresponding to each index keyword, and obtain the text subset corresponding to each subtext string.

After the inverted index between each to-be-deduplicated text and the subtext string in the text string set corresponding to the to-be-deduplicated text is obtained, the index objects corresponding to the same index keyword may be determined in the index pairs, to obtain the object set corresponding to each index keyword. The index keyword is the subtext string and the index object is the to-be-deduplicated text. Therefore, the object set corresponding to each index keyword is the text subset corresponding to each subtext string.

The deduplication unit 304 is configured to perform text deduplication processing on the text subset corresponding to each subtext string, to obtain a deduplicated text set corresponding to each subtext string.

To improve deduplication efficiency, the deduplication unit 304 may concurrently perform the text deduplication processing on the text subset corresponding to each subtext string.

In some embodiments, the text deduplication may be performed in a manner of dynamically maintaining a result set. Specifically, in some embodiments, a manner of comparing, in pairs, to-be-deduplicated texts corresponding to a specific subtext string (namely, a specific index keyword) for deduplication is: dynamically maintaining a result set, randomly selecting, as a seed text in an initial status, one text from the texts corresponding to the subtext string (namely, the index keyword), then traversing the to-be-deduplicated texts corresponding to the subtext string (namely, the index keyword), and attempting to add each traversed text to the result set. A specific text addition process is: determining whether the traversed text and each text in the result set are similar texts; and quitting traversal of the result set if the traversed text and a specific text in the result set are similar texts, and traversing the next to-be-deduplicated text; or adding the currently traversed text to the result set if no similar text of the traversed text is found after the result set is completely traversed, which indicates that there is no repetition between the to-be-deduplicated text and the texts in the known result set, and traversing the next to-be-deduplicated text. That is, the deduplication unit 304 may include:

a seed selection subunit, configured to select, for each subtext string, one to-be-deduplicated text as a seed text from the text subset corresponding to the subtext string, and add the seed text to an empty deduplication result set;

a traversing subunit, configured to: traverse the to-be-deduplicated texts in the text subset, and determine whether a currently traversed to-be-deduplicated text and the text in the deduplication result set are similar texts; and traverse the next to-be-deduplicated text in the text subset if the currently traversed to-be-deduplicated text and the text in the deduplication result set are similar texts; or add the currently traversed to-be-deduplicated text to the deduplication result set if the currently traversed to-be-deduplicated text and the text in the deduplication result set are not similar texts, and traverse the next to-be-deduplicated text in the text subset; and a text set obtaining subunit, configured to use, when all the texts in the text subset are traversed, the deduplication result set as the deduplicated text set corresponding to the subtext string.

For example, the traversing subunit is configured to: traverse the to-be-deduplicated text in the text subset, obtain a similarity parameter between the currently traversed to-be-deduplicated text and the text in the deduplication result set; and determine, according to the similarity parameter, whether the currently traversed to-be-deduplicated text and the text in the deduplication result set are similar texts.

There may be a plurality of similarity parameters in some embodiments. The similarity parameter may be selected according to an actual requirement, and for example, may include: a Jaccard similarity, an editing distance, a Hamming distance, and a semantic distance. When the similarity parameter may be a text similarity, for example, the Jaccard similarity, an obtaining manner of the text similarity includes:

respectively performing word-group segmentation processing on the currently traversed to-be-deduplicated text and the text in the deduplication result set, to obtain a first word group set corresponding to the currently traversed to-be-deduplicated text and a second word group set corresponding to the text in the deduplication result set; and obtaining a text similarity between the currently traversed to-be-deduplicated text and the text in the deduplication result set according to the first word group set and the second word group set.

In some embodiments of this application, to improve a deduplication computing speed, in some embodiments, text subsets of different subtext strings may be sent to different devices for deduplication, to implement concurrent deduplication. Specifically, the deduplication unit 304 may include:

a sending subunit, configured to send the text subset corresponding to each subtext string to a corresponding device, so that the device performs text deduplication processing on the text subset corresponding to the corresponding subtext string; and a receiving subunit, configured to receive the deduplicated text set that is of the corresponding subtext string and that is returned by the device, to obtain the deduplicated text set corresponding to each subtext string.

For example, after the texts are classified into corresponding index keywords, the sending subunit may use each index keyword as a key for hash, and allocate all the to-be-deduplicated texts to corresponding machine nodes (also referred to as worker nodes) according to hash values. Each worker node in a distributed cluster only needs to be responsible for deduplication work of a local machine. Then, the receiving subunit receives a deduplication result returned by the machine node. After each worker node completes the deduplication work, only unrepeated texts are left for each index keyword. These texts are re-aggregated to form a result set after the deduplication.

The result obtaining unit 305 is configured to obtain, according to the deduplicated text set corresponding to each subtext string, a result text set of the text set after the deduplication.

For example, the result obtaining unit 305 may be specifically configured to perform same text deduplication processing on the deduplicated text set corresponding to each subtext string (where only one of a plurality of same texts is left), to obtain result text set of the text set after the deduplication. For example, the deduplicated text set corresponding to each subtext string may be aggregated to obtain an initial result text set, and then same texts in the initial result text set are deduplicated. Certainly, the aggregation and the same-text deduplication may be performed at the same time.

During specific implementation, the foregoing units may be implemented as independent entities, or may be combined arbitrarily, or may be implemented as the same entity or several entities. For specific implementations of the foregoing units, refer to the foregoing method embodiments. Details are not described herein again.

The text deduplication apparatus may be specifically integrated into a computing device such as a terminal or a server.

It can be learned from the foregoing that in some embodiments of this application, the text obtaining unit 301 obtains the text set, the text set including the plurality of to-be-deduplicated texts; then, the capture unit 302 captures, for each to-be-deduplicated text, the corresponding subtext string from the to-be-deduplicated text; the determining unit 303 determines the to-be-deduplicated texts having the same subtext strings in the text set, and obtains the text subset corresponding to each subtext string; the deduplication unit 304 performs the text deduplication processing on the text subset corresponding to each subtext string, to obtain the deduplicated text set corresponding to each subtext string; the result obtaining unit 305 obtains, according to the deduplicated text set corresponding to each subtext string, the result text set of the text set after the deduplication. In this solution, the text deduplication processing may be performed on text subsets having the same subtext string, to implement text deduplication processing on the entire text set. The texts in the entire text set do not need to be compared in pairs for deduplication, and global deduplication of the texts through comparison in pairs may be changed as deduplication of the texts corresponding to the same subtext string. Therefore, a quantity of texts needing to be compared in pairs in the deduplication process can be greatly reduced, thereby reducing time complexity of the text deduplication and improving the text deduplication efficiency. In addition, because the quantity of texts needing to be compared in pairs in the deduplication process is decreased, storage space of the computing device into which the text deduplication apparatus is integrated can be saved, a processing speed and processing efficiency of a processor of the computing device can be improved, and processing time can be reduced.

Figure 4:
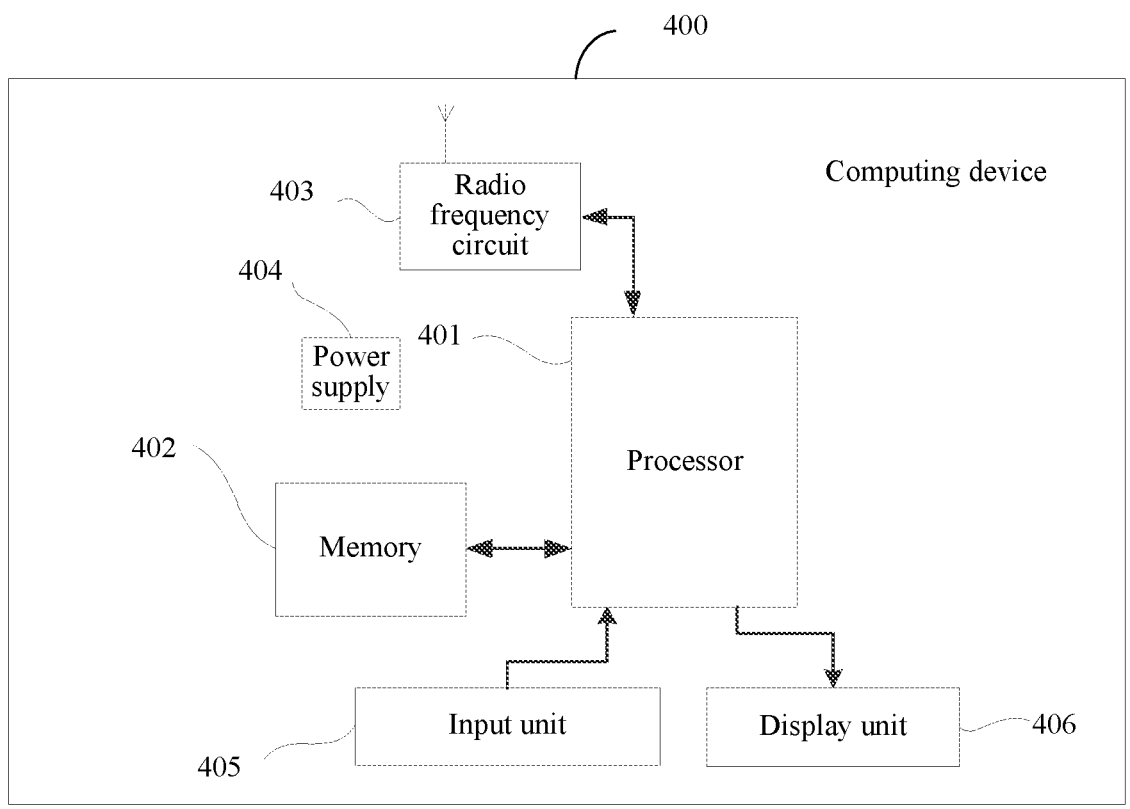
FIG. 4 is a schematic structural diagram of a computing device according to an embodiment of this application.

Correspondingly, an embodiment of this application further provides a computing device (for example, the server described in the foregoing embodiment). FIG. 4 is a schematic structural diagram of a computing device according to an embodiment of this application. Specifically, The computing device 400 may include components such as one or more processors 401 serving as processing cores, one or more memories 402 used as computer readable storage media, a radio frequency (RF) circuit 403, a power supply 404, an input unit 405, and a display unit 406. A person skilled in the art may understand that a structure of the computing device shown in FIG. 4 does not constitute a limitation on the computing device. The computing device may include more components or fewer components than those shown in the figure, or some components may be combined, or a different component deployment may be used.

The processor 401 is a control center of the computing device, and connects various parts of the entire computing device by using various interfaces and lines. By running or executing a software program and/or module stored in the memory 402, and invoking data stored in the memory 402, the processor 401 performs various functions of the computing device and processes data, thereby performing overall monitoring on the computing device. In some embodiments of this application, the processor 401 may include one or more processing cores. An application processor and a modem processor may be integrated into the processor 401. The application processor mainly processes an operating system, a user interface, an application program, and the like. The modem processor mainly processes wireless communication. It may be understood that the foregoing modem processor may alternatively not be integrated into the processor 401.

The memory 402 may be configured to store the software program and module. The processor 401 performs various functional applications and the data processing by running the software program and module that are stored in the memory 402.

The RF circuit 403 may be configured to receive and send a signal during information receiving and sending. Particularly, the RF circuit 403 sends, after receiving downlink information from a base station, the information to the one or more processors 401 for processing. In addition, the RF circuit 403 sends uplink data to the base station.

The computing device further includes the power supply 404 (for example, a battery) supplying power to the components. In some embodiments of this application, the power supply may be logically connected to the processor 401 by using a power supply management system, to implement a function of managing charge, discharge, power consumption, and the like by using the power supply management system. The power supply 404 may further include one or more of any components such as a direct current or alternating current power supply, a re-charging system, a power failure detection circuit, a power supply converter or inverter, and a power status indicator.

The computing device may further include the input unit 405. The input unit 405 may be configured to receive entered numeric or character information and generate a keyboard, mouse, joystick, optical, or trackball signal input related to user settings and function control.

The computing device may further include the display unit 406. The display unit 406 may be configured to display information entered by a user or information provided to the user, and various graphical user interfaces of the computing device. These graphical user interfaces each may include an image, a text, an icon, a video, or any combination thereof. The display unit 408 may include a display panel. Optionally, the display panel may be configured in a form of a liquid crystal display (LCD), an organic light-emitting diode (OLED), or the like.

Specifically, in some embodiments, the processor 401 in the computing device may load executable texts (namely, machine readable instructions) corresponding to processes of one or more application programs into the memory 402. The processor 401 runs the machine readable instructions, corresponding to the application programs, stored in the memory 402, to implement the following various functions:

obtaining a text set, the text set including a plurality of to-be-deduplicated texts; then, capturing, for each to-be-deduplicated text, a corresponding subtext string from the to-be-deduplicated text; determining to-be-deduplicated texts having the same subtext strings in the text set, to obtain a text subset corresponding to each subtext string; performing text deduplication processing on the text subset corresponding to each subtext string, to obtain a deduplicated text set corresponding to each subtext string; and obtaining, according to the deduplicated text set corresponding to each subtext string, a result text set of the text set after the deduplication.

In some embodiments of this application, the capturing, for each to-be-deduplicated text, a corresponding subtext string from the to-be-deduplicated text includes:

capturing, for each to-be-deduplicated text, the corresponding subtext string from the to-be-deduplicated text, to obtain a text string set corresponding to the to-be-deduplicated text; and the determining to-be-deduplicated texts having the same subtext strings in the text set, to obtain a text subset corresponding to each subtext string includes:

establishing, for each to-be-deduplicated text, an inverted index between the to-be-deduplicated text and the subtext string in the text string set corresponding to the to-be-deduplicated text; and determining, based on the inverted index, the to-be-deduplicated texts having the same subtext strings in the text set, to obtain the text subset corresponding to each subtext string.

In some embodiments of this application, the capturing, for each to-be-deduplicated text, an inverted index between the to-be-deduplicated text and the subtext string in the text string set corresponding to the to-be-deduplicated text includes:

using, as an index keyword for each to-be-deduplicated text, the subtext string in the text string set corresponding to the to-be-deduplicated text, and using the to-be-deduplicated text as an index object corresponding to the index keyword; and combining the index keyword and the index object corresponding to the index keyword into a corresponding index pair, to obtain the inverted index between the to-be-deduplicated text and the subtext string in the text string set corresponding to the to-be-deduplicated text.

In this case, the determining, based on the inverted index, the to-be-deduplicated texts having the same subtext strings in the text set, to obtain the text subset corresponding to each subtext string includes:

determining index objects corresponding to the same index keyword in the index pair, to obtain an object set corresponding to each index keyword, and obtain the text subset corresponding to each subtext string.

For specific operations, refer to the detailed descriptions of the foregoing embodiments of the text deduplication method, and details are not described herein again.

A person of ordinary skill in the art may understand that all or some of the steps of the methods in the foregoing embodiments may be implemented by a program instructing relevant hardware. The program may be stored in a non-transitory computer readable storage medium. The storage medium may include: a read-only memory (ROM), a random access memory (RAM), a magnetic disk, an optical disc, or the like.

The text deduplication method and apparatus provided in the embodiments of this application are described in detail above. The principle and implementations of this application are described herein by using specific examples. The descriptions of the foregoing embodiments are merely used for helping understand the method and core ideas of this application. In addition, a person skilled in the art can make variations to this application in terms of the specific implementations and application scopes according to the ideas of this application. Therefore, the content of this specification shall not be construed as a limit on this application.

What is claimed is:

1. A text deduplication method, applied to a computing device, and comprising:

obtaining, by the computing device, a text set, the text set comprising a plurality of to-be-deduplicated texts;

capturing, by the computing device for each to-be-deduplicated text, a corresponding subtext string from the to-be-deduplicated text, by:

capturing, for each to-be-deduplicated text, one or more subtext strings from the to-be-deduplicated text, to obtain a text string set corresponding to the to-be-deduplicated text;

determining, by the computing device in the text set, to-be-deduplicated texts having a same subtext string, to obtain text subsets, wherein each subtext string corresponds to a text subset, and each text subset includes one or more to-be-deduplicated texts that have the corresponding subtext string, and the text subsets are determined by:

establishing, for each to-be-deduplicated text, an inverted index between the to-be-deduplicated text and each of the one or more subtext strings in the text string set corresponding to the to-be-deduplicated text; and determining, based on the inverted index, the to-be-deduplicated texts having the same subtext string in the text set, to obtain the text subset corresponding to each subtext string;

performing text deduplication processing on the text subset corresponding to each subtext string, to obtain a deduplicated text set corresponding to each subtext string; and obtaining, by the computing device according to the deduplicated text set corresponding to each subtext string, a result text set of the text set after the deduplication.

2. The text deduplication method according to claim 1, wherein the establishing, for each to-be-deduplicated text, an inverted index between the to-be-deduplicated text and the one or more subtext strings in the text string set corresponding to the to-be-deduplicated text comprises:

using, for each to-be-deduplicated text, the one or more subtext strings in the text string set corresponding to the to-be-deduplicated text as one or more index keywords;

using the to-be-deduplicated text as an index object corresponding to the one or more index keywords; and combining each of the one or more index keywords and the index object corresponding to the index keyword into a corresponding index pair, to obtain the inverted index between the to-be-deduplicated text and each of the one or more subtext strings in the text string set corresponding to the to-be-deduplicated text.

3. The text deduplication method according to claim 1, wherein the performing text deduplication processing on the text subset corresponding to each subtext string, to obtain a deduplicated text set corresponding to each subtext string comprises:

selecting, for each subtext string, one to-be-deduplicated text from the text subset corresponding to the subtext string as a seed text, and adding the seed text to an empty deduplication result set; and traversing the to-be-deduplicated texts in the text subset.

4. The text deduplication method according to claim 3, further comprising:

obtaining a similarity parameter between a currently traversed to-be-deduplicated text and a text in the deduplication result set.

5. The text deduplication method according to claim 4, wherein the obtaining a similarity parameter between the currently traversed to-be-deduplicated text and the text in the deduplication result set comprises:

respectively performing word-group segmentation processing on the currently traversed to-be-deduplicated text and the text in the deduplication result set, to obtain a first word group set corresponding to the currently traversed to-be-deduplicated text and a second word group set corresponding to the text in the deduplication result set; and obtaining the similarity parameter between the currently traversed to-be-deduplicated text and the text in the deduplication result set according to the first word group set and the second word group set.

6. The text deduplication method according to claim 1, wherein the performing text deduplication processing on the text subset corresponding to each subtext string, to obtain a deduplicated text set corresponding to each subtext string comprises:

respectively allocating the text subsets to a plurality of devices, so that each device receives at least one of the text subsets and performs text deduplication processing on the received text subset; and receiving deduplicated text sets returned by the plurality of devices, to obtain the deduplicated text set corresponding to each subtext string.

7. The text deduplication method according to claim 1, wherein the capturing, for each to-be-deduplicated text, a corresponding subtext string from the to-be-deduplicated text comprises:

obtaining a capture length of the subtext string; and capturing, for each to-be-deduplicated text, one or more subtext strings from the to-be-deduplicated text with a sliding window according to the capture length.

8. The text deduplication method according to claim 7, wherein the capturing the one or more subtext strings from the to-be-deduplicated text comprises:

capturing the one or more subtext strings from the to-be-deduplicated text with the sliding window according to the capture length in response to determining a length of the to-be-deduplicated text is greater than or equal to the capture length; and using the to-be-deduplicated text as the subtext string in response to determining the length of the to-be-deduplicated text is less than the capture length.

9. A text deduplication apparatus, comprising: a processor and a memory connected to the processor, the memory storing a machine readable instruction executable to the processor, and the processor executing the machine readable instruction to perform:

obtaining a text set, the text set comprising a plurality of to-be-deduplicated texts;

capturing, for each to-be-deduplicated text, a corresponding subtext string from the to-be-deduplicated text, by:

capturing, for each to-be-deduplicated text, one or more subtext strings from the to-be-deduplicated text, to obtain a text string set corresponding to the to-be-deduplicated text;

determining, in the text set, to-be-deduplicated texts having a same subtext string, to obtain text subsets, wherein each subtext string corresponds to a text subset, and each text subset includes one or more to-be-deduplicated texts that have the corresponding subtext string, and the text subsets are determined by:

establishing, for each to-be-deduplicated text, an inverted index between the to-be-deduplicated text and each of the one or more subtext strings in the text string set corresponding to the to-be-deduplicated text; and determining, based on the inverted index, the to-be-deduplicated texts having the same subtext string in the text set, to obtain the text subset corresponding to each subtext string;

performing text deduplication processing on the text subset corresponding to each subtext string, to obtain a deduplicated text set corresponding to each subtext string; and obtaining, according to the deduplicated text set corresponding to each subtext string, a result text set of the text set after the deduplication.

10. The text deduplication apparatus according to claim 9, wherein the processor executes the machine readable instruction to perform:

using, for each to-be-deduplicated text, the one or more subtext strings in the text string set corresponding to the to-be-deduplicated text as one or more index keywords;

using the to-be-deduplicated text as an index object corresponding to the one or more index keywords;

combining each of the one or more index keywords and the index object corresponding to the index keyword into a corresponding index pair, to obtain the inverted index between the to-be-deduplicated text and each of the one or more subtext strings in the text string set corresponding to the to-be-deduplicated text.

11. The text deduplication apparatus according to claim 9, wherein the processor executes the machine readable instruction to perform:

selecting, for each subtext string, one to-be-deduplicated text from the text subset corresponding to the subtext string as a seed text, and adding the seed text to an empty deduplication result set; and traversing the to-be-deduplicated texts in the text subset.

12. The text deduplication apparatus according to claim 11, wherein the processor executes the machine readable instruction to perform:

obtaining a similarity parameter between a currently traversed to-be-deduplicated text and a text in the deduplication result set.

13. The text deduplication apparatus according to claim 9, wherein the processor executes the machine readable instruction to perform:

respectively allocating the text subsets to a plurality of devices, so that each device receives at least one of the text subsets and performs text deduplication processing on the received text subset; and receiving the deduplicated text set of the corresponding subtext string that is returned by the device, to obtain the deduplicated text set corresponding to each subtext string.

14. A non-transitory computer readable storage medium, the storage medium storing a machine readable instruction, and the machine readable instruction being executable to a processor to perform:

obtaining a text set, the text set comprising a plurality of to-be-deduplicated texts;

capturing, for each to-be-deduplicated text, a corresponding subtext string from the to-be-deduplicated text, by:
capturing, for each to-be-deduplicated text, one or more subtext strings from the to-be-deduplicated text, to obtain a text string set corresponding to the to-be-deduplicated text;

determining, in the text set, to-be-deduplicated texts having a same subtext string, to obtain text subsets, wherein each subtext string corresponds to a text subset, and each text subset includes one or more to-be-deduplicated texts that have the corresponding subtext string, and the text subsets are determined by:
establishing, for each to-be-deduplicated text, an inverted index between the to-be-deduplicated text and each of the one or more subtext strings in the text string set corresponding to the to-be-deduplicated text; and determining, based on the inverted index, the to-be-deduplicated texts having the same subtext string in the text set, to obtain the text subset corresponding to each subtext string;

performing text deduplication processing on the text subset corresponding to each subtext string, to obtain a deduplicated text set corresponding to each subtext string; and obtaining, according to the deduplicated text set corresponding to each subtext string, a result text set of the text set after the deduplication.

15. The non-transitory computer readable storage medium according to claim 14, wherein the establishing, for each to-be-deduplicated text, an inverted index between the to-be-deduplicated text and the one or more subtext strings in the text string set corresponding to the to-be-deduplicated text comprises:

using, for each to-be-deduplicated text, the one or more subtext strings in the text string set corresponding to the to-be-deduplicated text as one or more index keywords;

using the to-be-deduplicated text as an index object corresponding to the one or more index keywords; and combining each of the one or more index keywords and the index object corresponding to the index keyword into a corresponding index pair, to obtain the inverted index between the to-be-deduplicated text and each of the one or more subtext strings in the text string set corresponding to the to-be-deduplicated text.

16. The non-transitory computer readable storage medium according to claim 14, wherein the performing text deduplication processing on the text subset corresponding to each subtext string, to obtain a deduplicated text set corresponding to each subtext string comprises:

selecting, for each subtext string, one to-be-deduplicated text from the text subset corresponding to the subtext string as a seed text, and adding the seed text to an empty deduplication result set; and traversing the to-be-deduplicated texts in the text subset.

17. The non-transitory computer readable storage medium according to claim 16, wherein the machine readable instruction is further executable to the processor to perform:

obtaining a similarity parameter between a currently traversed to-be-deduplicated text and a text in the deduplication result set; and determining, according to the similarity parameter, whether the currently traversed to-be-deduplicated text and the text in the deduplication result set are similar texts.

18. The text deduplication method according to claim 2, wherein the determining, based on the inverted index, the to-be-deduplicated texts having the same subtext string in the text set, to obtain the text subset corresponding to each subtext string comprises:

determining index objects corresponding to the same index keyword based on index pairs obtained from the to-be-deduplicated texts, to obtain an object set corresponding to each index keyword as the text subset corresponding to each subtext string.

\* \* \* \* \*